(12) United States Patent
Zhang et al.

(10) Patent No.: US 10,411,256 B2
(45) Date of Patent: *Sep. 10, 2019

(54) CORE SHELL ACTIVE MATERIAL OF MONOCLINIC NIOBIUM-TITANIUM COMPOSITE OXIDE, NONAQUEOUS ELECTROLYTE BATTERY AND BATTERY PACK

(71) Applicant: KABUSHIKI KAISHA TOSHIBA, Minato-ku (JP)

(72) Inventors: Wen Zhang, Sagamihara (JP); Keigo Hoshina, Yokohama (JP); Yasuhiro Harada, Isehara (JP); Kazuki Ise, Fuchu (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 72 days.

This patent is subject to a terminal disclaimer.

(21) Appl. No.: 14/848,922

(22) Filed: Sep. 9, 2015

(65) Prior Publication Data
US 2016/0087275 A1  Mar. 24, 2016

(30) Foreign Application Priority Data

Sep. 18, 2014 (JP) .................... 2014-190449
Aug. 31, 2015 (JP) .................... 2015-170714

(51) Int. Cl.
*H01M 4/485* (2010.01)
*C01G 33/00* (2006.01)
(Continued)

(52) U.S. Cl.
CPC ............ *H01M 4/485* (2013.01); *C01G 33/00* (2013.01); *H01M 4/366* (2013.01); *H01M 4/587* (2013.01);
(Continued)

(58) Field of Classification Search
CPC .. H01M 4/485; H01M 4/587; H01M 10/0525; H01M 10/425; H01M 4/625;
(Continued)

(56) References Cited

U.S. PATENT DOCUMENTS

2013/0209863 A1   8/2013   Harada et al.
2014/0017520 A1   1/2014   Inagaki et al.
(Continued)

FOREIGN PATENT DOCUMENTS

CN   102593472 A   7/2012
CN   103081187 A   5/2013
(Continued)

OTHER PUBLICATIONS

Simakov, David SA, and Yoed Tsur. "Preparation of core-shell Ti—Nb oxide nanocrystals." Journal of Nanoparticle Research 10.1 (2008): 77-85.*

(Continued)

*Primary Examiner* — Milton I Cano
*Assistant Examiner* — Philip A. Stuckey
(74) *Attorney, Agent, or Firm* — Oblon, McClelland, Maier & Neustadt, L.L.P.

(57) ABSTRACT

According to one embodiment, there is provided an active material. The active material includes particles. Each of the particles includes a core phase and a shell phase surrounding at least a part of the core phase. The core phase includes a first monoclinic niobium-titanium composite oxide. The shell phase includes a second monoclinic niobium-titanium composite oxide. An oxidation number of titanium in the core phase is larger than an oxidation number of titanium in the shell phase, and/or an oxidation number of niobium in the core phase is larger than an oxidation number of niobium in the shell phase.

10 Claims, 14 Drawing Sheets

(51) Int. Cl.
  *H01M 4/36* (2006.01)
  *H01M 4/62* (2006.01)
  *H01M 10/052* (2010.01)
  *H01M 4/587* (2010.01)
  *H01M 10/0525* (2010.01)
  *H01M 10/42* (2006.01)
  *H01M 4/02* (2006.01)

(52) U.S. Cl.
  CPC ......... *H01M 4/625* (2013.01); *H01M 10/052* (2013.01); *H01M 10/0525* (2013.01); *H01M 10/425* (2013.01); *C01P 2002/76* (2013.01); *C01P 2002/77* (2013.01); *C01P 2002/85* (2013.01); *C01P 2004/03* (2013.01); *C01P 2004/84* (2013.01); *C01P 2006/40* (2013.01); *H01M 2004/028* (2013.01); *H01M 2010/4271* (2013.01); *H01M 2220/20* (2013.01)

(58) Field of Classification Search
  CPC ............... H01M 4/366; H01M 10/052; H01M 2220/20; H01M 2004/028; H01M 2010/4271; C01G 33/00; C01P 2006/40; C01P 2002/85; C01P 2004/84; C01P 2002/76; C01P 2004/03; C01P 2002/77
  See application file for complete search history.

(56) References Cited

U.S. PATENT DOCUMENTS

2014/0044997 A1   2/2014   Inagaki et al.
2014/0248531 A1   9/2014   Tan et al.

FOREIGN PATENT DOCUMENTS

| CN | 103247794 A | 8/2013 |
|----|-------------|--------|
| CN | 105122513 A | 12/2015 |
| EP | 2 477 264 A2 | 7/2012 |
| EP | 2 950 372 A1 | 12/2015 |
| JP | 2013-164934 A | 8/2013 |
| JP | 2013-535787 A | 9/2013 |
| WO | WO 2015/140936 A1 | 9/2015 |

OTHER PUBLICATIONS

Extended European Search Report dated Jan. 12, 2016 in European Patent Application No. 15184048.5.

C.M.Reich, et al., "Niobia Based Rutile Materials as SOFC Anodes" Fuel Cells 2001, vol. 1, No. 3-4, Nov. 14, 2001, 7 Pages.

Korean Office Action dated Aug. 22, 2016 in Patent Application No. 10-2015-0125260 (with English translation).

Anna Lashtabeg, et al., "Thermomechanical and Conductivity Studies of Doped Niobium Titanates as Possible Current Collector Material in the SOFC Anode" Ionics 9 (2003), Dec. 3, 2002, pp. 220-226.

Jian-Tao Han, et al., "New Anode Framework for Rechargeable Lithium Batteries" Chemistry of Materials, Mar. 29, 2011, pp. 2027-2029.

Combined Chinese Office Action and Search Report with a letter from the Chinese Patent Attorney issued Jul. 4, 2017 in Chinese Patent Application No. 201510567435.9 (with English translation of category of cited documents).

\* cited by examiner

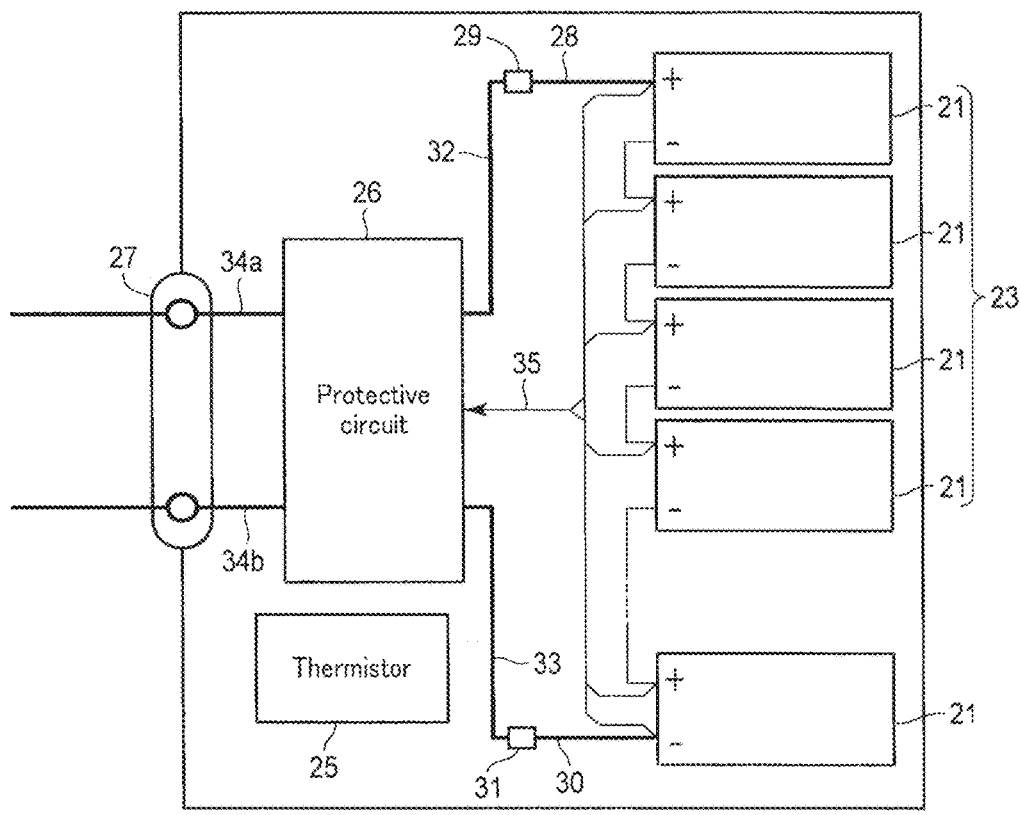
F I G. 15

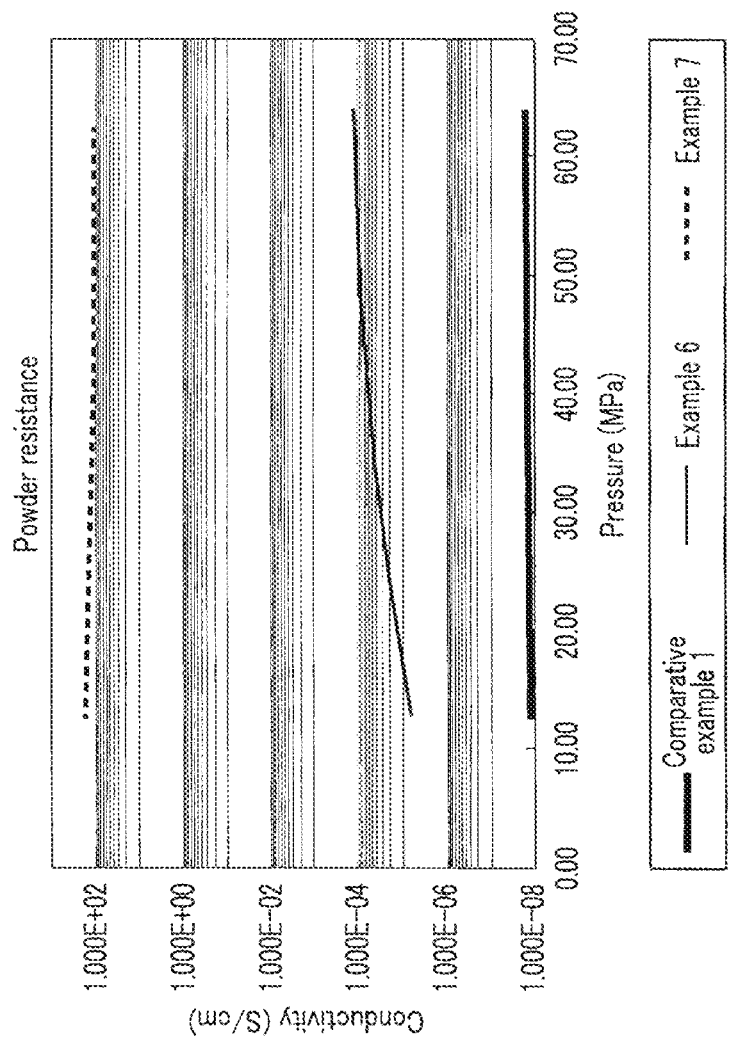
F I G. 23

CORE SHELL ACTIVE MATERIAL OF MONOCLINIC NIOBIUM-TITANIUM COMPOSITE OXIDE, NONAQUEOUS ELECTROLYTE BATTERY AND BATTERY PACK

CROSS-REFERENCE TO RELATED APPLICATIONS

This application is based upon and claims the benefit of priority from the Japanese Patent Applications No. 2014-190449, filed Sep. 18, 2014; and No. 2015-170714, filed Aug. 31, 2015, the entire contents of all of which are incorporated herein by reference.

FIELD

Embodiments described herein relate generally to an active material, a nonaqueous electrolyte battery and a battery pack.

BACKGROUND

Recently, a nonaqueous electrolyte battery such as a lithium-ion secondary battery has been developed as a battery having a high energy density. The nonaqueous electrolyte battery is expected to be used as a power source for vehicles such as hybrid vehicles or electric cars, or as a large-sized power source for electricity storage. Particularly, for use in vehicles, the nonaqueous electrolyte battery is desired to have other performances such as rapid charge-and-discharge performances and long-term reliability. A nonaqueous electrolyte battery enabling rapid charge and discharge not only remarkably shortens the charging time but also makes it possible to improve performances related to the motive force of a hybrid vehicle and to efficiently recover regenerative energy.

In order to enable rapid charge and discharge, it is necessary for electrons and lithium ions to be able to migrate rapidly between the positive electrode and the negative electrode. When a battery using a carbon-based material in the negative electrode undergoes repeated rapid charge and/or discharge, dendrite precipitation of metal lithium may occur on the electrode. Dendrites may cause internal short circuits, which can lead to heat generation and fires.

In light of this, a battery using, as the negative electrode active material, a metal composite oxide in place of a carbonaceous material has been developed. Particularly, in a battery using titanium oxide as the negative electrode active material, rapid charge and discharge can be performed stably. Such a battery also has a longer life than those using a carbonaceous material.

However, titanium oxide has a higher (nobler) potential relative to metal lithium than that of the carbonaceous material. In addition, titanium oxide has a lower capacity per weight. Therefore, a battery using titanium oxide has a problem in that the battery has low energy density.

For example, an electrode potential of an electrode using titanium oxide is about 1.5 V based on metal lithium. This potential is higher (nobler) than that of the electrode using carbon-based negative electrode. The potential of titanium oxide is due to the redox reaction between $Ti^{3+}$ and $Ti^{4+}$ when lithium is electrochemically absorbed and released. Therefore, the potential is limited electrochemically. Further, there is the fact that rapid absorption and release of lithium ions can be stably performed at an electrode potential as high as about 1.5 V. Therefore, it is substantially difficult to lower the potential of the electrode to improve energy density.

Further, for the capacity of the battery per unit weight, the theoretical capacity of a lithium-titanium composite oxide such as $Li_4Ti_5O_{12}$ is 175 mAh/g. On the other hand, the theoretical capacity of a general graphite-based electrode material is 372 mAh/g. Thus, the capacity density of titanium oxide is significantly lower than that of the carbon-based negative electrode. This is due to a reduction in substantial capacity because there are only a small number of lithium-absorption sites in the crystal structure and lithium tends to be stabilized in the structure.

In view of such circumstances, a new electrode material containing Ti and Nb has been examined. Particularly, a composite oxide represented by $TiNb_2O_7$ has a theoretical capacity of 387 mAh/g. This is because during the Li-absorption into this compound, charge compensation, in which Ti changes from tetravalence to trivalence and Nb changes pentavalence to trivalence, takes place. The composite oxide represented by $TiNb_2O_7$ can exhibit such a high capacity, and has been a focus of attention.

However, a niobium-titanium composite oxide $TiNb_2O_7$ has low electronic conductivity in a state in which Li is not absorbed. Therefore, a nonaqueous electrolyte battery including the niobium-titanium composite oxide represented by $TiNb_2O_7$ has a problem in that overvoltage in a low-SOC is increased, resulting in reducing the input and output characteristics of a battery.

BRIEF DESCRIPTION OF THE DRAWINGS

FIG. 15 is a block diagram showing an electric circuit of the battery pack shown in FIG. 14;

FIG. 23 is a graph showing a relation between a pressure applied to an active material and the conductivity of the active material, with respect to each of the active materials of Examples 7 and 6 and Comparative Example 1.

DETAILED DESCRIPTION

In general, according to one embodiment, there is provided an active material. The active material includes particles. Each of the particles includes a core phase and a shell phase surrounding at least a part of the core phase. The core phase includes a first monoclinic niobium-titanium composite oxide. The shell phase includes a second monoclinic niobium-titanium composite oxide. An oxidation number of titanium in the core phase is larger than an oxidation number of titanium in the shell phase, and/or an oxidation number of niobium in the core phase is larger than an oxidation number of niobium in the shell phase.

The embodiments will be explained below with reference to the drawings. In this case, the structures common to all embodiments are represented by the same symbols and duplicated explanations will be omitted. Also, each drawing is a typical view for explaining the embodiments and for promoting the understanding of the embodiments. Though there are parts different from an actual device in shape, dimension and ratio, these structural designs may be properly changed taking the following explanations and known technologies into consideration.

First Embodiment

According to a first embodiment, there is provided an active material. The active material includes particles. Each of the particles includes a core phase and a shell phase surrounding at least a part of the core phase. The core phase includes a first monoclinic niobium-titanium composite oxide. The shell phase includes a second monoclinic niobium-titanium composite oxide. An oxidation number of titanium in the core phase is larger than an oxidation number of titanium in the shell phase, and/or an oxidation number of niobium in the core phase is larger than an oxidation number of niobium in the shell phase.

A monoclinic niobium-titanium composite oxide can provide a battery capable of undergoing stable repeated rapid charge and discharge without damaging rate performance and energy density, for the reasons mentioned below.

Firstly, an example of a crystal structure of the monoclinic niobium-titanium composite oxide will be described with reference to FIG. 1.

Figure 1:
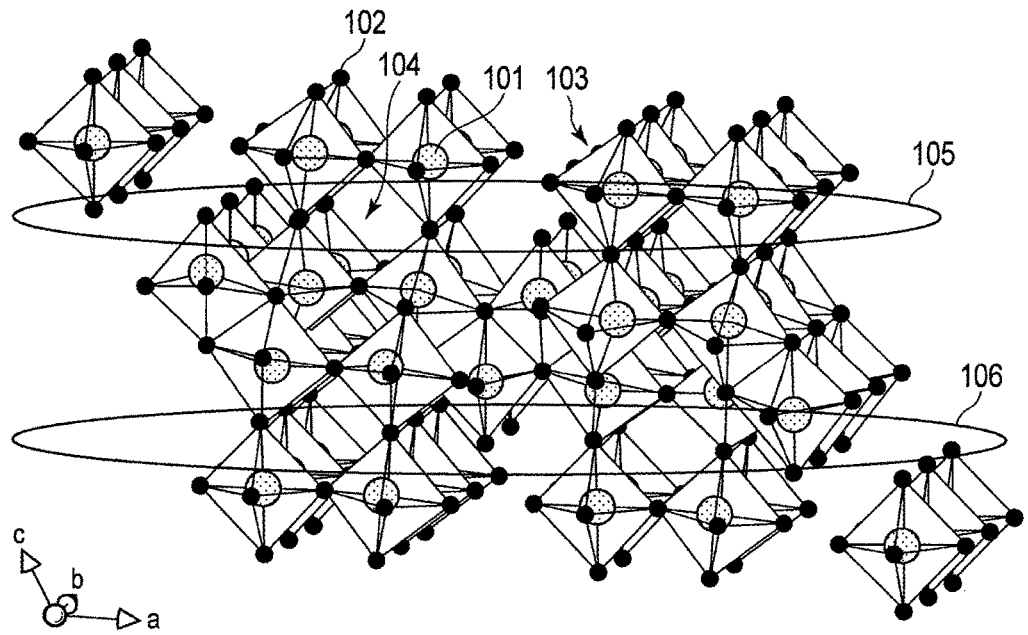
FIG. 1 is a schematic view showing a crystal structure of a niobium-titanium composite oxide represented by $Nb_2TiO_7$.
Figure 2:
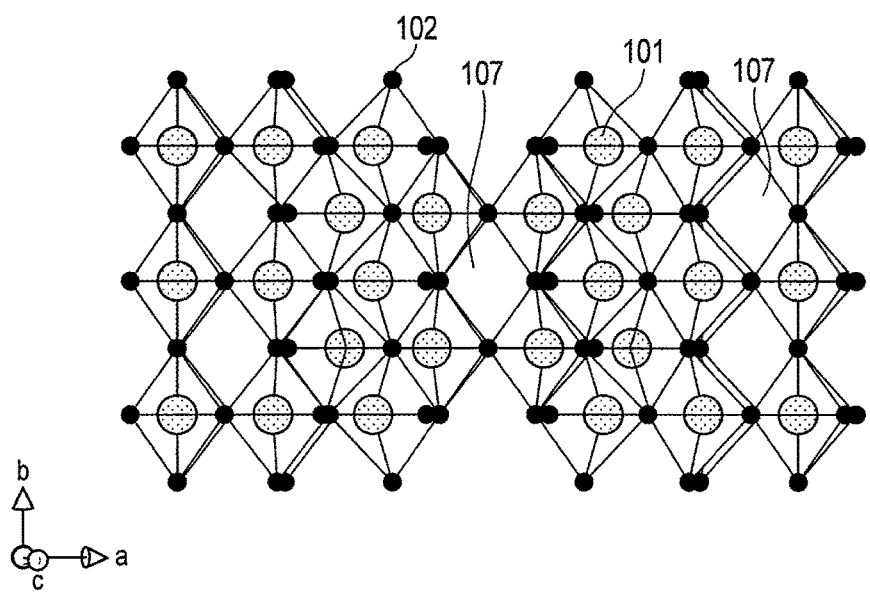
FIG. 2 is a schematic view showing the crystal structure of FIG. 1 shown from a different direction.

FIG. 1 is a schematic view showing a crystal structure of the niobium-titanium composite oxide represented by $Nb_2TiO_7$ that is one example of a monoclinic niobium-titanium composite oxide. FIG. 2 is a schematic view showing the crystal structure of FIG. 1 shown from a different direction.

As shown in FIG. 1, the crystal structure of the niobium-titanium composite oxide represented by $Nb_2TiO_7$ has a configuration in which metal ions 101 and oxide ions 102 constitute skeleton structure portion 103. Note here that in each metal ion 101, Nb ions and Ti ions are arranged in the ratio of Nb to Ti of 2:1 at random. The skeleton structure portions 103 are alternately arranged three-dimensionally to thus provide void portions 104 among the skeleton structure portions 103. The void portions 104 are hosts for lithium ions. The void portions 104 can occupy a large portion with respect to the entire crystal structure as show in FIG. 1. In addition, the void portions 104 can maintain a structure stably even if lithium ions are absorbed.

In FIG. 1, a region 105 and a region 106 are portions each having two-dimensional channel in the [100] direction and the [010] direction. As respectively shown in FIG. 2, the crystal structure of the monoclinic niobium-titanium composite oxide has void portions 107 in the [001] direction. The void portion 107 has a tunnel structure that is suitable for conduction of lithium ions, and functions as a conduction route for connecting the region 105 and the region 106 in the [001] direction. Presence of the conduction route enables a lithium ion to come and go between the region 105 and the region 106.

In this way, the crystal structure of the monoclinic niobium-titanium composite oxide represented by $Nb_2TiO_7$ has a large space into which lithium ions can be equivalently absorbed, and has a structural stability. Furthermore, the structure includes regions having two-dimensional channels in which the lithium ion diffuses rapidly and the [001] direction conduction route connecting them. Thus, in the crystal structure of the monoclinic niobium-titanium composite oxide represented by $Nb_2TiO_7$, the absorption properties of the lithium ions to the absorption space and the release properties of the lithium ions from the absorption space are improved, and the absorption and release space for the lithium ions is effectively increased. As a result, high capacity and a high rate performance can be provided.

In addition, in the above-mentioned crystal structure, when a lithium ion is absorbed into the void portion 104, the metal ion 101 constituting the skeleton structure portion 103 is reduced to trivalent, and thus, the electrical neutrality of the crystal can be kept. In the monoclinic niobium-titanium composite oxide, not only the Ti ion is reduced from tetravalent to trivalent, but also the Nb ion is reduced from pentavalent to trivalent. Therefore, reduction valence per weight of the active material is high. Therefore, even when a large number of lithium ions are absorbed, the electrical neutrality of the crystal can be kept. Consequently, the monoclinic niobium-titanium composite oxide has a higher energy density as compared with a compound such as titanium oxide, which includes only a tetravalent cation. Specifically, the theoretical capacity of the monoclinic niobium-titanium composite oxide is about 387 mAh/g, which is more than twice as high as that of a titanium oxide having a spinel structure.

Furthermore, the niobium-titanium composite oxide has lithium absorption potential of about 1.5 V (vs. Li/Li+). Therefore, use of the active material including the monoclinic niobium-titanium composite oxide can provide a battery capable of undergoing stable and rapid repeated charge and discharge.

As mentioned above, the use of the active material including the monoclinic niobium-titanium composite oxide can achieve a nonaqueous electrolyte battery capable of exhibiting excellent rapid charge and discharge performance and having a high energy density.

In particles included in the active material according to the first embodiment, a core phase and a shell phase include such a monoclinic niobium-titanium composite oxide, respectively. However, the oxidation number of titanium included in the core phase is larger than the oxidation number of titanium included in the shell phase, and/or the oxidation number of niobium included in the core phase is larger than the oxidation number of titanium included in the shell phase. This signifies that in the particles, a second monoclinic niobium-titanium composite oxide included in the shell phase has the same monoclinic crystal structure as that of a first monoclinic niobium-titanium composite oxide, but is more reduced than the first monoclinic niobium-titanium composite oxide included in the core phase. That is to say, each of particles included in the active material according to the first embodiment includes the monoclinic niobium-titanium composite oxide, and at least the surface thereof is reduced.

Since the active material having such a structure, according to the first embodiment, includes particles whose surface is deficient in oxygen, the active material can have more excellent electronic conductivity as compared with the active material not including a particle whose surface is deficient in oxygen. Furthermore, the reduced shell phase has the same monoclinic crystal structure as that of the core phase. Therefore, the active material according to the first embodiment can maintain the initial efficiency and the initial capacity, and can exhibit an excellent capacity and high rate characteristics similar to those of an active material including not-reduced monoclinic niobium-titanium composite oxide. As a result, the active material according to the first embodiment can achieve a nonaqueous electrolyte battery having excellent input and output characteristics and cycle characteristics.

When the active material according to the first embodiment is used as a negative electrode active material in a nonaqueous electrolyte battery, lithium is absorbed into the first and second monoclinic niobium-titanium composite oxides by charging. As explained above, when the first and second monoclinic niobium-titanium composite oxides absorb lithium, the valences of niobium and titanium is changed. Furthermore, even when the active material according to the first embodiment is discharged to a discharge final voltage in the nonaqueous electrolyte battery, lithium may remain in the first and second monoclinic niobium-titanium composite oxides. In this case, niobium and titanium are regarded to be reduced by lithium absorbed in the crystal structure and the actual measurement value is corrected, and the corrected values are defined as valences of niobium and titanium in the first and second monoclinic niobium-titanium composite oxides. A specific method is mentioned later.

In the active material according to the first embodiment, it is preferable that the first monoclinic niobium-titanium composite oxide included in the core phase is a niobium-titanium composite oxide represented by a formula: $Nb_2TiO_7$. As aforementioned, the active material including the niobium-titanium composite oxide represented by the formula: $Nb_2TiO_7$ can achieve a nonaqueous electrolyte battery capable of exhibiting excellent rapid charge and discharge performance and having a high energy density.

The niobium-titanium composite oxide represented by the composition formula: $Nb_2TiO_7$ may cause oxygen deficiency in raw materials or intermediates during preparation thereof. Furthermore, inevitable impurity included in the raw materials and impurity mixed during preparation may be provided in a prepared monoclinic system oxide. Consequently, the first monoclinic niobium-titanium composite oxide may include an oxide having a composition which is out of the stoichiometric ratio represented by the formula: $Nb_2TiO_7$ due to, for example, the above-mentioned inevitable factors. For example, due to the unavoidable oxygen deficiency occurring during the preparation of the monoclinic system oxide, a monoclinic system oxide having a composition represented by a formula: $Nb_2TiO_{7-\delta}$ ($0<\delta\leq0.3$) may be prepared.

When the first monoclinic niobium-titanium composite oxide is a niobium-titanium composite oxide represented by the formula: $Nb_2TiO_7$, the second monoclinic niobium-titanium composite oxide included in the shell phase has the oxidation number of titanium of not more than 4, and/or the oxidation number of niobium of less than 5. The oxidation number of niobium in the second monoclinic niobium-titanium composite oxide included in the shell phase is preferably 4 or more and less than 5. Furthermore, the oxidation number of titanium in the second monoclinic niobium-titanium composite oxide included in the shell phase is preferably more than 3 and not more than 4.

It is preferable that the second monoclinic niobium-titanium composite oxide has the same crystal structure as that of the monoclinic niobium-titanium composite oxide represented by the formula: $Nb_2TiO_7$. The monoclinic niobium-titanium composite oxide having the same crystal structure as that of the monoclinic niobium-titanium composite oxide represented by the formula: $Nb_2TiO_7$ can achieve a nonaqueous electrolyte battery capable of exhibiting excellent rapid charge and discharge performance and having a high energy density, by the same principle as explained above.

In the particles including the core phase including the first monoclinic niobium-titanium composite oxide and the shell phase including the second monoclinic niobium-titanium composite oxide, the molar ratio of niobium to titanium Nb/Ti is preferably within a range of $0<Nb/Ti\leq2$. An active material which includes particles having a molar ratio of niobium to titanium Nb/Ti within a range of $0<Nb/Ti\leq2$, can contribute to improving electronic conductivity. More preferably, the molar ratio of niobium to titanium Nb/Ti is within a range of $0.02$ $Nb/Ti\leq2$.

It is preferable that the second monoclinic niobium-titanium composite oxide is an oxide represented by a composition formula: $Nb_{1.33}Ti_{0.67}O_4$. Note here that when the second monoclinic niobium-titanium composite oxide is an oxide represented by the formula: $Nb_{1.33}Ti_{0.67}O_4$, it may include an oxide having a composition which is out of the stoichiometric ratio represented by the formula: $Nb_{1.33}Ti_{0.67}O_4$ due to the above-mentioned inevitable factors.

The thinner the shell phase is, the more improved rate characteristics of the nonaqueous electrolyte battery produced by using the active material according to the first embodiment can be. It is preferable that the shell phase has a thickness of 50 nm or less. Furthermore, it is preferable that the shell phase has a thickness of not less than 1 nm. The shell phase has preferably a thickness corresponding to 0.6% or more and 30% or less, and more preferably a thickness corresponding to 1% or more and 10% or less, with respect to a particle diameter of particles included in the active material.

The active material according to the first embodiment can further include a carbon layer to cover the particle. Such a carbon layer can enhance the electronic conductivity between the particles. Such a carbon layer can be in, for example, an amorphous carbon state. Alternatively, such a carbon layer may be in a crystalline form, for example, graphite. The active material according to the first embodiment may not include a carbon layer.

The particle included in the active material according to the first embodiment may be a primary particle, or a secondary particle formed through coagulation of the primary particles. It is preferable that an average primary particle diameter of particles is 3 μm or less. The average particles having primary particle diameter of 3 μm or less can allow absorption of Li to proceed sufficiently, and can improve the electronic conductivity sufficiently. An average primary particle diameter of particles is preferably 0.2 μm or more. The average primary particle diameter of particles is more preferably within a range from 0.5 μm to 1.5 μm. An average secondary particle diameter of particles is preferably within a range from 5 μm to 12 μm, and more preferably within a range from 5 μm to 10 μm.

Next, the active material according to the first embodiment will be described in more detail with reference to drawings.

Figure 3:
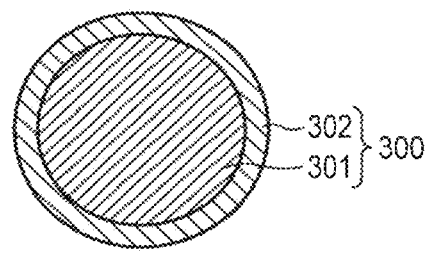
FIG. 3 is a schematic sectional view of an active material of a first example according to a first embodiment.
Figure 4:
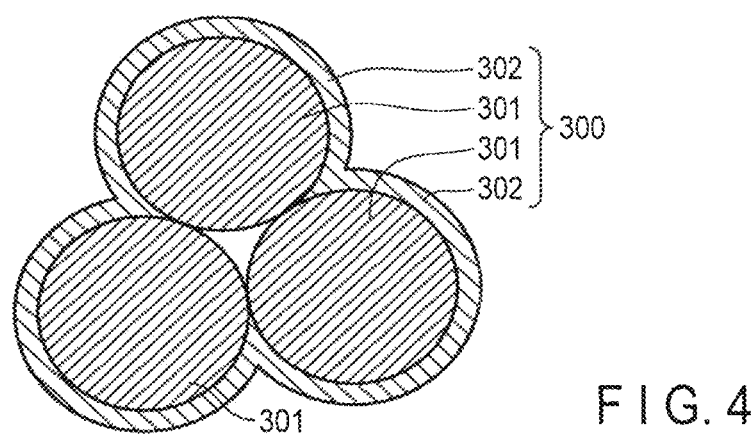
FIG. 4 is a schematic sectional view of an active material of a second example according to the first embodiment.
Figure 5:
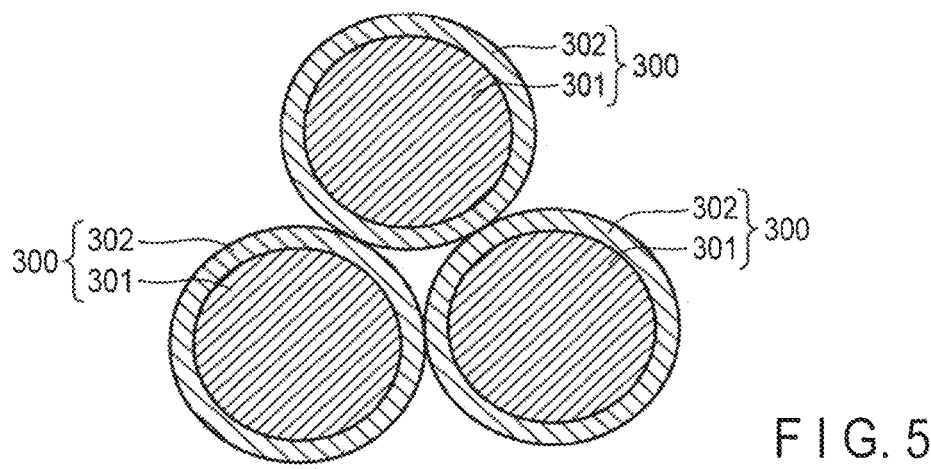
FIG. 5 is a schematic sectional view of an active material of a third example according to the first embodiment.

FIG. 3 is a schematic sectional view of an active material of a first example according to a first embodiment. FIG. 4 is a schematic sectional view of an active material of a second example according to the first embodiment. FIG. 5 is a schematic sectional view of an active material of a third example according to the first embodiment.

An active material 300 of the first example shown in FIG. 3 is a primary particle. The active material 300 shown in FIG. 3 includes a core phase 301. The core phase 301 includes a first monoclinic niobium-titanium composite oxide. The active material 300 shown in FIG. 3 further includes a shell phase 302. The shell phase 302 includes a second monoclinic niobium-titanium composite oxide. The shell phase 302 surrounds the core phase 301.

An active material 300 of the second example shown in FIG. 4 is a secondary particle. The active material 300 shown in FIG. 4 includes a plurality of core phases 301. The core phases 301 coagulate to each other to form a secondary particle. The active material 300 shown in FIG. 4 further includes a shell phase 302 surrounding the secondary particle including core phases 301.

An active material 300 of the third example shown in FIG. 5 is secondary particle which is formed by coagulating the active materials 300 of the first example shown in FIG. 3 to each other.

FIGS. 3 to 5 are shown as if a boundary were provided between the core phase 301 and the shell phase 302 in order to recognize the core phase 301 and the shell phase 302. However, as explained above, the first monoclinic niobium-titanium composite oxide included in the core phase 301 and the second monoclinic niobium-titanium composite oxide included in the shell phase 302 have the same crystal structure. Therefore, actually, there is no boundary between the core phase 301 and the shell phase 302.

(Manufacturing Method)

An active material according to the first embodiment can be manufactured by, for example, the following method.

Firstly, particles of the monoclinic niobium-titanium composite oxide are prepared.

The particles of the monoclinic niobium-titanium composite oxide can be manufactured by, for example, the following methods.

A. Liquid-Phase Synthesis Method

Particles of a monoclinic niobium-titanium composite oxide can be manufactured by, for example, the below-mentioned liquid-phase synthesis method. In the liquid-phase synthesis method, a reaction proceeds in a state in which an Nb element and a Ti element mixed with each other in an atomic level.

Firstly, an acid solution in which a Ti compound is dissolved (hereinafter, which is referred to as an acid solution (A)), and an acid solution in which an Nb compound is dissolved (hereinafter, which is referred to as an acid solution (B)) are mixed with each other.

As each of the acid solutions (A) and (B), the acid solution having pH of 5 or less, and more preferably, pH of 2 or less is used. When each of the acid solutions (A) and (B) has pH of 5 or less, the Ti compound or the Nb compound can be maintained stably in a state in which it is dissolved in a solvent, and hydrolysis does not occur before addition of an alkaline solution, thus enabling each of the acid solutions (A) and (B) to be prevented from being gelled.

A starting raw material for each of the acid solutions (A) and (B) is not particularly limited, but it is possible to use a solution in which hydroxide, sulfide, oxide, salt, alkoxide, and an organic substance, which contains Ti or Nb, is dissolved in a suitable solvent such as pure water, ethanol, and acid, respectively.

The starting raw material is not particularly limited, and examples of the Ti compound include titanyl sulfate ($TiOSO_4$), titanium oxide ($TiO_2$), ammonium titanium oxalate ($(NH_4)_2TiO(C_2O_4) \cdot H_2O$), metatitanic acid ($TiO(OH)_2$), isopropyl titanate ($C_{12}H_{28}O_4Ti$), and titanium chloride ($TiCl_4$). Furthermore, examples of the Nb compound include niobium chloride ($NbCl_5$), niobium hydroxide ($Nb(OH)_5$), ammonium niobium oxalate ($C_2H_8N_2O_4 \cdot Nb$), and niobium oxide ($Nb_2O_5$).

Solutions which are stable as an aqueous solution can be used for mixture as it is, but when, for example, metal chloride and metal alkoxide are used, hydrolysis may proceed, making it difficult to obtain a coprecipitate. Therefore, it is necessary to suppress the water content in the solution. A temperature at which mixing is carried out is preferably ambient temperature, but heating may be carried out when starting raw materials which are not easily dissolved are used.

The molar concentration of Ti in the acid solution (A) is not particularly limited, but the molar concentration is preferably in the range from 0.01 to 10 mol/L, and more preferably in the range from 0.1 to 5.0 mol/L.

Furthermore, the molar concentration of Nb in the acid solution (B) is not particularly limited, but the molar concentration is preferably in the range from 0.01 to 10 mol/L, and more preferably in the range from 0.1 to 5.0 mol/L.

When the molar concentration of Ti or Nb in each of the acid solutions (A) and (B) is not less than the above-mentioned lower limit value, the molar concentration of Ti or Nb is not too low, and as a result, a sufficient amount of the coprecipitates can be obtained, thus improving the productivity. Furthermore, when the molar concentration of Ti or Nb in each of the acid solutions (A) and (B) is not more than the above-mentioned upper limit value, the concentration of Ti or Nb is not too high, and as a result, hydrolysis does not easily occur and coprecipitate can be stably precipitated, thus improving the quality of the active material.

When the acid solutions (A) and (B) are mixed with each other, a mixing ratio of the acid solutions (A) and (B) are adjusted such that the molar ratio of Nb to Ti (Nb/Ti) is within the range of 1<Nb/Ti≤2, and more preferably within the range of 1.3<Nb/Ti≤2. The molar ratio herein is a molar ratio during preparation, and it may be different from the composition ratio of Nb to Ti in manufactured active materials. The solution obtained as mentioned above is liquid having fluidity and is not hydrolyzed, and thus not gelled.

Note here that in this embodiment, the acid solutions (A) and (B) are separately prepared and then mixed with each other, as well as a solution in which the Ti compound and Nb compound are dissolved from the first (hereinafter, which is referred to as an acid the solution (C)) may be prepared. The pH of the solution (C) is preferably 5 or less, and more preferably, 2 or less. When the pH of the solution (C) is 5 or less, hydrolysis does not occur before an alkaline solution is added, and gelation of the solution (C) can be prevented.

When the pH needs to be adjusted during preparation of the acid solutions (A), (B), and (C), pH may be adjusted by using an inorganic acid such as sulfuric acid and hydrochloric acid or an organic acid such as acetic acid.

Furthermore, the Ti compound and the Nb compound included in the solution (C) may be the same as the Ti compounds and the Nb compounds included in the acid solutions (A) and (B), respectively. The solvent may be also a suitable solvent, for example, pure water, ethanol, acid, and the like. The molar ratio of Nb to Ti (Nb/Ti) included in the solution (C) is preferably in the range of 1<Nb/Ti≤2, and more preferably in the range of 1.3<Nb/Ti≤2.

The molar concentrations of Ti and Nb in the solution (C) are not particularly limited, but the molar concentration of Ti is preferably in the range from 0.01 to 10 mol/L, and more preferably in the range from 0.1 to 5.0 mol/L. Furthermore, the molar concentration of Nb is preferably in the range from 0.01 to 10 mol/L, and more preferably in the range from 0.1 to 5.0 mol/L.

When the molar concentrations of Ti and Nb in the solution (C) are not less than the above-mentioned lower limit value, the concentrations of Ti and Nb are not too low, and as a result, a sufficient amount of the coprecipitates can be obtained, thus improving the productivity. Furthermore, when the molar concentrations of Ti and Nb in the solution (C) are not more than the above-mentioned upper limit value, the concentrations of Ti and Nb are not too high, and as a result, hydrolysis does not easily occur and coprecipitate can be stably precipitated, thus improving the quality of the active material.

Next, an alkaline solution as a pH regulating agent is mixed to the mixed solution including the Ti compound and Nb compound prepared as mentioned above, and coprecipitate is precipitated. The pH regulating agent is preferably an alkaline solution, and a solution having pH of 8 or more and more preferably pH of 12 or more is preferable. It is preferable that the pH of the solution is higher because coprecipitates can be precipitated with smaller amount of liquid. As the pH regulating agent, for example, aqueous ammonia having a concentration of 35 wt % is used. Other than the aqueous ammonia, sodium hydroxide, potassium hydroxide, lime water, and the like, can be used. The reaction temperature is preferably from 10° C. to 80° C., and the temperature can be appropriately selected depending upon the coagulating degree and shapes of particles of the obtained coprecipitate.

Methods for mixing a pH regulating agent may include a method of putting a drop of the pH regulating agent into the mixed solution containing a Ti compound and a Nb compound, and, on the contrary, a method of putting a drop of the mixed solution containing a Ti compound and a Nb compound into the pH regulating agent. The coagulating degree of precipitate and particles shape can be controlled by the method, speed, timing of putting a drop of liquid. More preferably, it is preferable that a small amount of the pH regulating agent is gradually added into the mixed solution from the viewpoint of suppressing excessive coagulation. Addition of the pH regulating agent can adjust the pH of the mixed solution including Ti and Nb to the alkali side. The pH may be adjusted by monitoring the precipitate state of the coprecipitate, but as the reference, the pH is in the range of 1 to 10, and the pH is preferably in the range from 6 to 9. Thus, coprecipitate including Ti and Nb can be precipitated.

Next, the precipitated coprecipitate is washed. A solution to be used for washing is preferably, for example, pure water. As a goal for washing, washing is sufficiently carried out such that the pH of waste liquid after washing is in the range from 6 to 8, more preferably near neutral. After the washing is sufficiently carried out, filtration and drying are carried out so as to obtain precursor powder.

The thus obtained precursor is a composite coprecipitate in which Nb and Ti are mixed with each other, and more preferably the precursor is an amorphous composite hydroxide. An amorphous precursor powder in which Ti and Nb are mixed homogeneously in this way enables the reactivity during sintering to be enhanced, so that as compared with conventional solid phase reaction methods, or the like, an Nb—Ti composite oxide can be sintered at a lower temperature and for a shorter time, and the temperature and time in the following sintering process can be suppressed.

The precursor powder after filtration and drying may be coagulated. Furthermore, the particle size of the primary particles may be nonuniform due to the influence of types of the raw materials. In this case, the particles are preferably pulverized by a mechanical pulverization method such as methods using a ball mill and a bead mill.

Next, the obtained precursor powder is subjected to sintering. The sintering is carried out at temperatures ranging from 400° C. to 1450° C. The sintering time is 1 to 12 hours. More preferably, the sintering temperature is from 950 to 1100° C., and the sintering time is 1 hour to 5 hours. Sintering in such conditions enables a phase including a niobium-titanium composite oxide to be formed.

Furthermore, when the sintering temperature is 800° C. or higher, grain growth and necking between particles proceed. Therefore, from the viewpoint of improving crystallinity while suppressing the grain growth and the necking between particles, an annealing process at a temperature ranging from 600° C. to 800° C. and for 1 to 24 hours can be added before or after the above-mentioned firing.

The sintering of the precursor is preferably carried out through heat treatment by rapidly heating to a temperature of 1000° C. or higher at a temperature increasing rate of 30° C./min or more. $TiNb_2O_7$ is generated at 900° C. or higher. At 400° C., anatase titanium dioxide starts to be generated, and at 800° C., rutile titanium dioxide starts to be generated. Therefore, when the temperature increasing rate is slow, the titanium dioxide is generated earlier, so that rutile titanium dioxide oxide after being sintering may be precipitated independently and separated from $TiNb_2O_7$.

The sintering atmosphere may be an inert gas atmosphere such as air, nitrogen, argon, and helium atmosphere, or a vacuum atmosphere. However, in order to obtain oxide, an oxidative atmosphere is preferable. Specifically, an air atmosphere is preferable. Furthermore, sintering may be carried out in an air atmosphere whose oxygen concentration is intentionally enhanced.

Powder after being sintered may include necking of particles, or excessively grown particles. Therefore, it is preferable that pulverization is carried out by a mechanical pulverization method using a ball mill and a bead mill because fine particles can be formed. However, mechanical pulverization may damage the crystallinity of the active material. In this case, it is preferable that an annealing process at a temperature in the range from 600° C. to 800° C. for one hour to 24 hours is added after the above-mentioned process because the crystallinity of the active material can be improved.

Furthermore, when the particle size after being sintering is 1 µm or less, it is preferable that granulating is carried out by, for example, a spray dry method, because dispersion of slurry in the process of producing an electrode is improved and the coatability of the slurry becomes stable.

B. Solid-Phase Manufacturing Method

The solid-phase method is a method for synthesizing a product by weighing a powder of each of raw materials such that a desired composition is obtained and mixing thereof, followed by carrying out heat treatment. An example of the method for manufacturing the active material particles including niobium and titanium according to the solid-phase method will be described hereinafter.

Firstly, starting raw materials are mixed so that an Nb/Ti ratio is a predetermined molar ratio. The starting raw material is not particularly limited, but examples of Ti-containing compounds include titanium oxide and titanium oxyhydroxide. Examples of Nb-containing compounds include niobium oxide and niobium hydroxide. The niobium-titanium composite oxide is known to have a plurality of phases such as $TiNb_2O_7$, $Ti_2Nb_{10}O_{29}$, and $TiNb_{24}O_{62}$. In the case that the particle diameter of the starting raw material is bulky, when an Nb element and a Ti element thermally diffuse during sintering, uniform diffusion of the Nb element and the Ti element takes a long time, and therefore phases such as $TiNb_2O_7$, $Ti_2Nb_{10}O_{29}$, and $TiNb_{24}O_{62}$ can be formed due to a concentration gradient. Therefore, particle diameter of the raw material is preferably 5 µm or less, and more preferably 1 µm. These are mixed by methods such as a ball mill, a vibrating mill, and a bead mill. However, this mixing is carried out for a shortened time in order not to damage the crystallinity of the powder of each of raw materials. The mixing method may be a wet type or a dry type.

Next, the obtained powder is sintering. This sintering corresponds to the sintering of precursor mentioned above. However, since the solid-phase method is a synthesizing method for allowing a reaction to proceed by thermal diffusion of particle interfaces of a raw material, sintering is carried out preferably at a high temperature. Therefore, the sintering temperature is preferably in a range from 1000° C. to 1400° C. Furthermore, the sintering time is preferably 10 hours or longer.

Furthermore, when once or a plurality of times of processes for re-pulverizing and annealing the obtained powder, crystals having high crystallinity, although they are fine particles, can be manufactured. The pulverization is carried out by a method such as wet-type bead mill pulverization.

Herein, the annealing process corresponds to the aforementioned annealing process which is carried out for enhancing the crystallinity. The annealing temperature is preferably from 700° C. to 1100° C., and annealing time is preferably from one to five hours.

C. Sol-Gel Process

A sol-gel process is a method for synthesizing powder by subjecting a sol made of alkoxide or the like to hydrolysis and polycondensation, thus gelling thereof, and then drying thereof, followed by heat treatment at high temperatures. An example of the method for manufacturing active material particles including niobium and titanium according to the sol-gel process will be described hereinafter.

Firstly, starting solutions are mixed so that an Nb/Ti ratio becomes a predetermined molar ratio. Examples of the starting solutions include solutions containing hydroxide, sulfide, oxide, salt, alkoxide, and organic substance, which contain Ti or Nb. Examples of Ti sources include $TiOSO_4$, $TiO_2$, $(NH_4)_2TiO(C_2O_4) \cdot H_2O$, $TiO(OH)_2$, $C_{12}H_{28}O_4Ti$, and $TiCl_4$. Examples of Nb sources include $NbCl_5$, $Nb(OH)_5$, $C_2H_8N_2O_4 \cdot Nb$, and $Nb_2O_5$.

The starting solutions are sufficiently mixed in a solution state, and then the water content and the pH are appropriately adjusted, thus allowing the hydrolysis to proceed so as to obtain a gel state.

This gel-state substance is dried and then sintered to obtain target powder. The sintering herein corresponds to the sintering of the precursor mentioned above. The sintering is carried out preferably at a temperature in a range from 700° C. to 1400° C. The sintering time at this time is preferably from one hour to 24 hours. Furthermore, a process for pulverizing the precursor by a ball mill, a vibrating mill, a bead mill, and the like, may be carried out before the sintering process.

Next, for example, particles of the monoclinic niobium-titanium composite oxide prepared as mentioned above are subjected to heat treatment in the reducing atmosphere. Heat treatment of the particles in the reducing atmosphere can reduce Nb element and/or Ti element included in surface layers of the particles. Thus, the active material according to the first embodiment can be manufactured.

It is preferable that the reducing atmosphere is a mixture gas atmosphere of Ar, He, or nitrogen, which includes 20% or less of hydrogen gas. The heat treatment in the reducing atmosphere is sintering at temperatures preferably from 400° C. to 1450° C., and more preferably 700° C. to 1100° C. The sintering time is preferably one hour or less. According to these conditions, the conductivity of the active material can be sufficiently enhanced while the battery capacity or diffusion property of Li into the active material particles are maintained.

For example, when the particles of the monoclinic niobium-titanium composite oxide are subjected to the above-mentioned heat treatment without causing coagulation, it is possible to obtain active materials that are similar to the active materials 300 of the first example shown in FIG. 3. On the other hand, when the particles of the monoclinic niobium-titanium composite oxide are coagulated to give secondary particles and then the secondary particles are subjected to the above-mentioned heat treatment, it is possible to obtain active materials that are similar to the active materials 300 of the second example shown in FIG. 4. By disintegrating coagulated active materials that are similar to the active materials 300 of the second example by arbitrary means, it is possible to obtain active materials including particles including a core phase and a shell phase surrounding a part of the core phase. The active materials 300 shown in FIG. 5 can be obtained by, for example, coagulating the active materials 300 shown in FIG. 3.

Furthermore, carbon can be further combined with respect to the particle which has undergone the above-mentioned heat treatment. A method for combining the particle with carbon is not particularly limited. Examples of the carbon source include sugars, polyolefins, nitriles, alcohols, and other organic compounds including a benzene ring. Furthermore, particles can be supported by carbon black, graphite, or the like by mechanical methods such as a method using a planetary ball mill. Powder after being sintered and the carbon source are mixed with each other, and then the mixture is sintered in a reducing atmosphere or in an inert atmosphere. The sintering temperature is preferably 900° C. or lower. When the sintering temperature is higher than 900° C., a reduction reaction of the Nb element further proceeds and may produce precipitates in the different phase, for example, $NbO_2$. Preferable examples of the atmosphere include atmospheres of the above-mentioned gases including nitrogen, carbon dioxide, argon, and reduction gas.

Furthermore, when the particle size after being sintered is 1 μm or less, it is preferable that granulating is carried out by, for example, a spray dry method, because dispersion of slurry in the process of producing an electrode is improved and coatability becomes stable.

<Powder X-Ray Diffractometry>

A crystal structure of a compound included in the active material can be verified by powder X-ray diffractometry of an active material.

The powder X-ray diffractometry of an active material is carried out as follows.

Firstly, a subject sample is pulverized until an average particle diameter is about 5 μm. The average particle diameter can be obtained by a laser diffraction method. The pulverized sample is filled in a 0.2 mm-deep holder part formed in a glass sample plate. At this time, it is carefully noted that the sample is sufficiently filled in the holder part. Furthermore, it should be careful to avoid cracking and formation of voids or the like, due to shortage of filling of the sample. Next, another glass plate is sufficiently pushed thereto from the outside to make the sample smooth. At this time, it should be careful to avoid too much or too little amount of the sample to be filled, thereby preventing any concavity and convexity with respect to the reference plane of a holder. Next, the glass plate filled with the sample is set in a powder X-ray diffraction device, and a diffraction pattern is obtained by using a Cu—Kα ray.

Note here that when the orientation of the sample is high, a position of a peak may be displaced and a peak intensity ratio may be changed depending upon the way of filling the sample. Such a sample having remarkably high orientation may be measured by using a capillary. Specifically, the measurement is carried out by inserting the sample into the capillary, and mounting the capillary on a rotary sample stage. Such a measurement method can liberalize the orientation.

Active materials included as electrode materials in a battery can be measured as follows.

Firstly, a state in which lithium ions are completely released from the active material is obtained. For example, when the active material is used in a negative electrode, a battery is completely discharged. Thus, a crystal state of the active material can be observed. However, even in the discharged state, a residual lithium ion may exist. Next, a battery is disassembled in a glove box filled with argon and the electrode is taken out. Then, the taken-out electrode is washed with an appropriate solvent. Examples of the solvent for washing include ethyl methyl carbonate. Next, the washed electrode is cut into a piece having the same area as that of a holder of a powder X-ray diffraction device to obtain a sample to be examined. The thus obtained sample is directly attached to a glass holder and subjected to measurement. At this time, a position of a peak originating in an electrode substrate such as a metal foil is measured in advance. Furthermore, peaks of other components such as a conductive agent and a binder are also measured in advance. When the peak of the substrate and the peak of the active material are overlapped with each other, it is desirable that a layer (for example, an active material layer, which will be described later) including the active material be exfoliated from the substrate and the layer be subjected to measurement. An aim of this is to separate overlapped peaks when the peak intensity is measured quantitatively. For example, the active material layer can be exfoliated by irradiating an electrode substrate with an ultrasonic wave in a solvent.

Next, the active material layer is sealed into the capillary, and the capillary is mounted on the rotary sample stage. In this way, an XRD pattern of the active material can be obtained while the influence of the orientation is reduced.

The thus obtained XRD pattern is analyzed by the Rietveld method. In the Rietveld method, a diffraction pattern is calculated from a crystal structure model that has been estimated in advance. Fitting of all the calculated values and the actual measurement values permits precise analysis of parameters relating to the crystal structure (lattice constant, atomic coordinate, occupancy, and the like). Thus, characteristics of the crystal structure of a compound included in the active material to be measured can be examined.

<Verification Method for Composition of Active Material>

A composition of an active material can be verified by using, for example, Inductively Coupled Plasma Atomic Emission Spectrometry.

<Method for Analyzing Oxidation Number of Element Included in Active Material Particle>

An oxidation number of each of elements included in active material particles can be analyzed by X-ray Photoelectron Spectroscopy (XPS) with respect to active material particles.

According to the X-ray Photoelectron Spectroscopy, element information on a surface is obtained from the binding energy value of bound electrons in a substance. Also, information on valence and a binding state is obtained from energy shift of each peak. In addition, quantitation can be carried out by using a peak area ratio.

The X-ray Photoelectron Spectroscopy with respect to the surface of the active material particles can be carried out as follows.

Firstly, a negative electrode is taken out from a discharged battery. The recovered electrode is treated in the same manner as in the electrode for the XRD analysis to obtain a sample to be examined.

The obtained sample is set in an ultra-high vacuum. In this state, the surface of the sample is irradiated with a soft X-ray, and a photoelectron released from the surface is detected by an analyzer. Since a distance for which the photoelectron can advance in the substance (average free path) is several nm, the detection depth in this analysis technique is several nm.

A cross-section of the electrode can be cut out by, for example, ion milling, and the cut-out electrode can be subjected to the XPS analysis. Thereby, information about the inside of the active material can be obtained.

Figure 6:
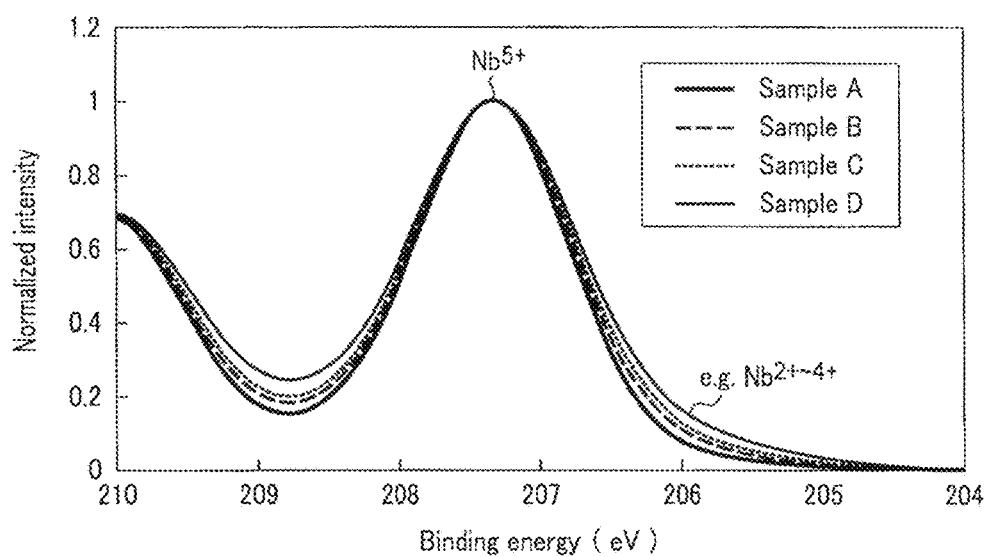
FIG. 6 is a part of an XPS chart of each of the active materials of some examples according to the first embodiment and the other active material.
Figure 7:
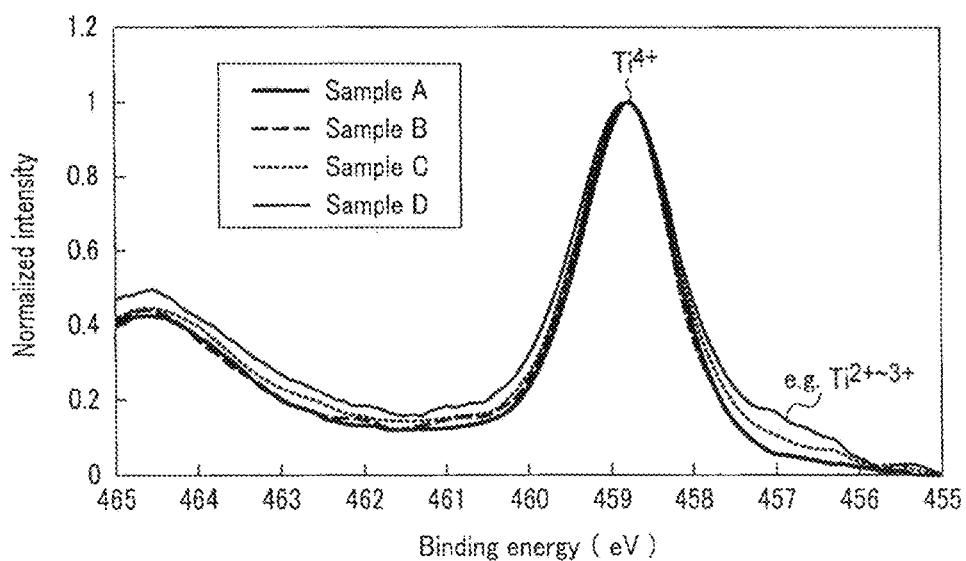
FIG. 7 is another part of an XPS chart of each of the active materials of some examples according to the first embodiment and the other active material.

Charts obtained by the X-ray Photoelectron Spectroscopy with respect to surfaces of some active materials are shown in FIGS. 6 and 7.

FIG. 6 is a part of an XPS chart of each of the active materials of some examples according to the first embodiment and the other active material; and FIG. 7 is another part of an XPS chart of each of the active materials of some examples according to the first embodiment and the other active material.

Each of the curves shown by thick lines in FIGS. 6 and 7 is an XPS chart of a niobium-titanium composite oxide particle (sample A) which has not undergone heat treatment in the reducing atmosphere. Each of the curves shown by broken lines in FIGS. 6 and 7 is an XPS chart of a sample B obtained by subjecting a niobium-titanium composite oxide particles that is the same as the sample A to heat treatment in an atmosphere of Ar—$H_2$ (3%) at 900° C. for 30 minutes. Each of the curves shown by dotted lines in FIGS. 6 and 7 is an XPS chart of a sample C obtained by subjecting the niobium-titanium composite oxide particle that is the same as the sample A to heat treatment in an atmosphere of Ar—$H_2$ (3%) at 900° C. for 60 minutes. Each of the curves shown by thin lines in FIGS. 6 and 7 is an XPS chart of a sample D obtained by subjecting the niobium-titanium composite oxide particle that is the same as the sample A to heat treatment in an atmosphere of Ar—$H_2$ (3%) at 900° C. for 90 minutes.

It is shown from FIG. 6 that the samples which have undergone heat treatment in the reducing atmosphere show higher intensity of a peak at around 206 eV as compared with the intensity of the sample which has not undergone the heat treatment. Furthermore, it is shown that the samples which have undergone the heat treatment for a longer time show higher intensity of a peak at around 206 eV. On the other hand, in FIG. 6, the intensity of peak at around 207.3 eV representing $Nb^{5+}$ is substantially the same in the sample A which has not undergone the heat treatment and the samples which have undergone the heat treatment for a long time. It is known that the intensity of peak at around 206 eV is the intensity attributed to $Nb^{2+}$ to $Nb^{4+}$. Furthermore, it is known that the intensity of a peak around 207.3 eV is the intensity attributed to $Nb^{5+}$. That is to say, the XPS charts of FIG. 6 shows that, according to the heat treatment in the reducing atmosphere, the valence of niobium on the surface of the titanium niobium composite oxide is smaller than +5.

Furthermore, it is shown from FIG. 7 that the samples which have undergone heat treatment in the reducing atmosphere show higher intensity of a peak at around 457.1 eV as compared with the intensity of the sample which has not undergone the heat treatment. Furthermore, it is shown that the samples which have undergone the heat treatment for a longer time show higher intensity around 457 eV. On the other hand, in FIG. 7, the intensity of a peak at around 458.8 eV representing $Ti^{4+}$ is substantially the same in the sample A which has not undergone the heat treatment and the samples which have undergone the heat treatment for a long time. It is known that the intensity of a peak at around 457.1 eV is the intensity attributed to $Ti^{2+}$ to $Ti^+$. Furthermore, it is known that the intensity of a peak at around 458.8 eV is the intensity attributed to $Ti^{4+}$. That is to say, the XPS charts of FIG. 7 show that, according to the heat treatment in the reducing atmosphere, the valence of titanium on the surface of the titanium niobium composite oxide is smaller than +4.

Furthermore, the samples B to D are etched in the depth direction and subjected to XPS measurement, to obtain charts the same as in the sample A. Thus, it is shown that the samples B to D are niobium-titanium composite oxides each including a core phase and a shell phase surrounding the core phase, in which the oxidation number of niobium included in the core phase is larger than the oxidation number of niobium included in the shell phase, and the oxidation number of titanium included in the core phase is larger than the oxidation number of titanium included in the shell phase. That is to say, the samples B to D are the active materials according to the first embodiment. Specifically, in the sample D, about 10% of Ti and Nb of the surface has a lower valence than the valence of the inside.

<Determination Method of Boundary Between Shell Phase and Core Phase>

A boundary between the shell phase and the core phase is determined by the following procedure.

Firstly, the oxidation numbers of Nb and Ti on the surfaces of particles of the active material are examined by the XPS analysis described above. Next, the surfaces of the active materials are etched in the depth direction by Ar milling. Then, the oxidation numbers of Nb and Ti on the newly obtained surfaces are examined by the XPS analysis again. The milling by Ar and the XPS analysis are repeated. The depth at which the oxidation number of Nb on the surfaces obtained by milling is +4 to +5 of the surface or the depth at which the oxidation number of Ti on the surfaces obtained by milling is +3 to +4 is defined as the thicknesses of the shell phase of the active material.

<Observation of Shape of Active Material>

A shape of the active material according to the first embodiment can be observed by using, for example, Scanning Electron Microscopy (SEM).

The observation under the Scanning Electron Microscopy can be carried out by producing a sample to be examined by the same technique as the technique by which the sample to be examined was produced for measurement by the X-ray Photoelectron Spectroscopy, and observing the produced sample under the Scanning Electron Microscopy.

Figure 8:
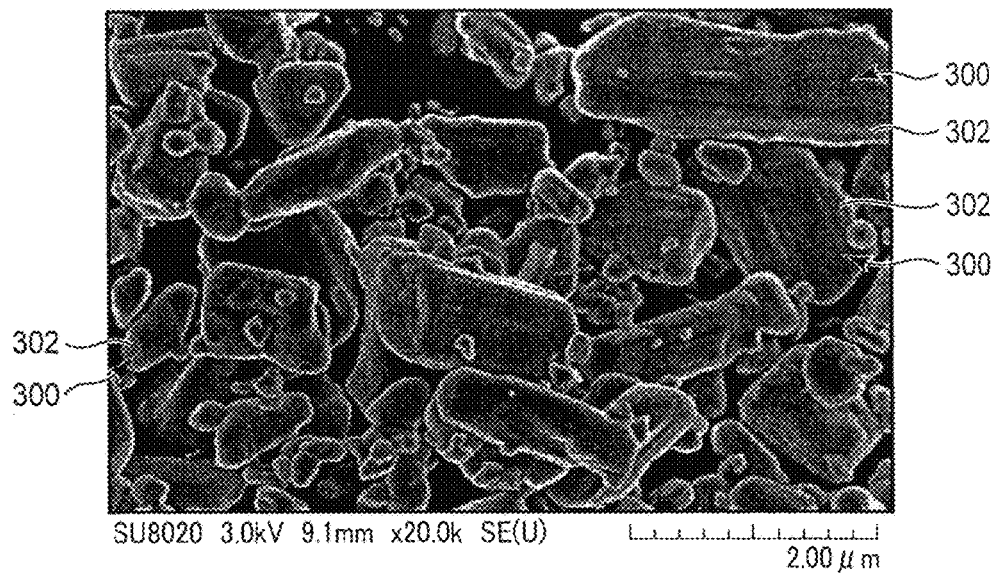
FIG. 8 is an SEM photograph of an active material of one example according to the first embodiment.
Figure 9:
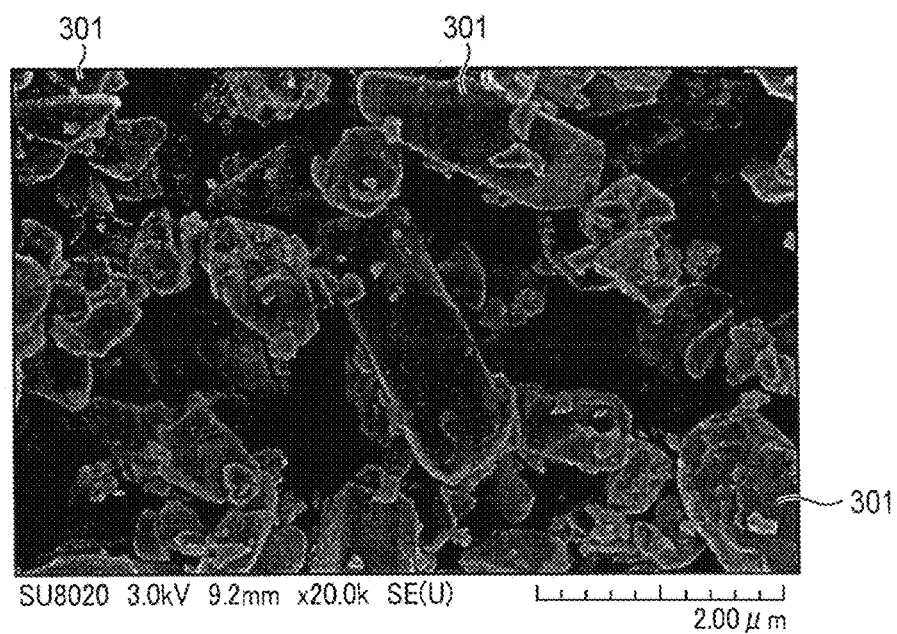
FIG. 9 is an SEM photograph of another active material.

Photographs by the Scanning Electron Microscopy with respect to some active materials are shown in FIGS. 8 and 9.

FIG. 8 is an SEM photograph of an active material of one example according to the first embodiment. FIG. 9 is an SEM photograph of another active material.

Specifically, FIG. 9 shows an SEM image of the niobium-titanium composite oxide particles which have not undergone heat treatment in the reducing atmosphere. Furthermore, FIG. 8 shows an SEM image of the active material particles which have undergone heat treatment in an atmosphere of Ar—$H_2$ (3%) at 1000° C. for 60 minutes.

The SEM image in FIG. 8 shows a plurality of active material particles 300 each of which includes shell phase 302 on the surface thereof. As shown in FIG. 8, each of the shell phase 302 has smooth surface. On the other hand, the SEM image in FIG. 9 shows niobium-titanium composite oxide particles 301, but the particles do not have smooth surfaces.

The active material according to the first embodiment includes particles each of which includes a core phase and a shell phase. The shell phase surrounds at least a part of the core phase. The core phase includes the first monoclinic niobium-titanium composite oxide. The shell phase includes the second monoclinic niobium-titanium composite oxide. The oxidation number of titanium in the core phase is larger than the oxidation number of titanium in the shell phase, and/or the oxidation number of niobium included in the core phase larger than the oxidation number of niobium included in the shell phase. Thus, the active material according to the first embodiment can achieve a nonaqueous electrolyte battery having excellent input-and-output characteristics and excellent cycle characteristics.

Second Embodiment

According to a second embodiment, there is provided a nonaqueous electrolyte battery containing the active material according to the first embodiment. The nonaqueous electrolyte battery includes a positive electrode, a negative electrode, and a nonaqueous electrolyte. The active material according to the first embodiment can be used in the negative electrode and/or the positive electrode.

The nonaqueous electrolyte battery according to the second embodiment may further include a separator provided between the positive electrode and the negative electrode. The positive electrode, the negative electrode and the separator can form electrode group. The nonaqueous electrolyte can be held in the electrode group.

The nonaqueous electrolyte battery according to the second embodiment may include an exterior member accommodating the electrode group and the nonaqueous electrolyte.

In addition, the nonaqueous electrolyte battery according to the second embodiment can include a positive electrode terminal electrically connected to the positive electrode and a negative electrode terminal electrically connected to the negative electrode. At least a part of the positive electrode terminal and at least a part of the negative electrode terminal are extended to the outside of an exterior member.

Hereinafter, a negative electrode, a positive electrode, nonaqueous electrolyte, a separator, an exterior member, a positive electrode terminal, and a negative electrode terminal, which can be included in the nonaqueous electrolyte battery using the active material according to the first embodiment for the negative electrode, will be described in detail.

(1) Negative Electrode

A negative electrode includes a negative electrode current collector, and a negative electrode layer (a negative electrode active material containing layer) supported by one or both surfaces of the negative electrode current collector.

The negative electrode layer can include a negative electrode active material, a conductive agent and a binder.

As the negative electrode active material, the active material according to the first embodiment is used. As the negative electrode active material, the active material according to the first embodiment can be used alone or as a mixture with other active material. Examples of the other negative electrode active material include titanium dioxide having an anatase structure $TiO_2$, titanium dioxide having a monoclinic structure $TiO_2$ (B), lithium titanate having a ramsdellite structure $Li_2Ti_3O_7$, lithium titanate having a spinel structure $Li_4Ti_5O_{12}$, niobium oxide, and niobium-containing composite oxide. These oxides are suitably used because they have similar specific gravity to that of compounds included in the active material according to the first embodiment, and they can be easily mixed and dispersed.

The conductive agent is blended to enhance the current collecting performance of the active material, and to suppress the contact resistance between the active material and the current collector. Examples of the conductive agent include carbonaceous materials such as acetylene black, carbon black and graphite.

The binder is blended to fill gaps in the dispersed negative electrode active material, and to bind the negative electrode active material and the current collector each other.

Examples of the binder include polytetrafluoroethylene (PTFE), polyvinylidene fluoride (PVdF), fluoro-rubber, and styrene butadiene rubber.

It is preferable that the active material, the conductive agent, and the binder in the negative electrode layer are blended at ratios from 68% by mass to 96% by mass, from 2% by mass to 30% by mass, and from 2% by mass to 30% by mass, respectively. When the amount of the conductive agent is not less than 2% by mass, the current collecting performance of the negative electrode layer can be improved. Furthermore, when the amount of the binder is not less than 2%, binding property between the negative electrode layer and the current collector becomes sufficient and, in turn, the excellent cycle characteristics can be expected. On the other hand, it is preferable in view of achieving high capacity that the amounts of the conductive agent and the binder are not more than 28% by mass.

As the negative electrode current collector, materials which are electrochemically stable at the absorption and release potential of lithium of the negative electrode active material are used. It is preferable that the negative electrode current collector is formed of copper, nickel, stainless steel or aluminum, or an aluminum alloy including one or more elements selected from Mg, Ti, Zn, Mn, Fe, Cu, and Si. It is preferable that the thickness of the negative electrode current collector is from 5 to 20 μm. The negative electrode current collector having such a thickness can balance the strength of the negative electrode and lightening.

The negative electrode is prepared by, for example, suspending the negative electrode active material, the binder and the conductive agent into a generally used solvent to prepare slurry, applying the slurry onto the current collector, drying thereof to form a negative electrode layer, and then pressing thereof.

Alternatively, the negative electrode can be also produced by forming the negative electrode active material, the binder and the conductive agent into a pellet to obtain a negative electrode layer, and disposing the layer on the current collector.

(2) Positive Electrode

A positive electrode can include a positive electrode current collector, and a positive electrode layer (a layer containing a positive electrode active material) supported by one or both surfaces of the positive electrode current collector electrode.

The positive electrode layer can include a positive electrode active material and a binder.

As the positive electrode active material, oxide, sulfide, and polymer can be used. Examples thereof include manganese dioxide ($MnO_2$), iron oxide, copper oxide, and nickel oxide each of which absorbs lithium, lithium-manganese composite oxide (for example, $Li_xMn_2O_4$ or $Li_xMnO_2$), lithium-nickel composite oxide (for example, $Li_xNiO_2$), lithium-cobalt composite oxide (for example, $Li_xCoO_2$), lithium-nickel-cobalt composite oxide (for example, $LiNi_{1-y}Co_yO_2$), lithium-manganese-cobalt composite oxide (for example, $Li_xMn_yCo_{1-y}O_2$), lithium-manganese-nickel composite oxide having a spinel structure ($Li_xMn_{2-y}Ni_yO_4$), lithium-phosphorus oxide having an olivine structure ($Li_xFePO_4$, $Li_xFe_{1-y}Mn_yPO_4$, $Li_xCoPO_4$, and the like), iron sulfate ($Fe_2(SO_4)_3$), vanadium oxide (for example, $V_2O_5$), and lithium-nickel-cobalt-manganese composite oxide. In the above-mentioned formulae, $0<x\leq1$ and $0<y\leq1$ are satisfied. As the positive electrode active material, one compound of them may be used alone, or combination of a plurality of these compounds may be used.

As the polymer, for example, conductivity polymer materials such as polyaniline and polypyrrole, or disulfide polymer materials may be used. Sulfur (S) and carbon fluoride also may be used as the active material.

Preferable examples of the active materials include lithium-manganese composite oxide having a high positive electrode voltage (for example, $Li_xMn_2O_4$), lithium-nickel composite oxide (for example, $Li_xNiO_2$), lithium-cobalt composite oxide (for example, $Li_xCoO_2$), lithium-nickel-cobalt composite oxide (for example, $LiNi_{1-y}Co_yO_2$), lithium-manganese-nickel composite oxide having a spinel structure (for example, $Li_xMn_{2-y}Ni_yO_4$), lithium-manganese-cobalt composite oxide (for example, $Li_xMn_yCo_{1-y}O_2$), lithium iron phosphate (for example, $Li_xFePO_4$), and lithium-nickel-cobalt-manganese composite oxide. In the above-mentioned formulae, $0<x\leq1$ and $0<y\leq1$ are satisfied.

Among them, when nonaqueous electrolyte including an ordinary temperature molten salt is used, it is preferable from the viewpoint of cycle life that at least one selected from lithium iron phosphate $Li_xVPO_4F$ ($0<x\leq1$), lithium-manganese composite oxide, lithium-nickel composite oxide and lithium-nickel-cobalt composite oxide is used. This is preferable because reactivity among the positive electrode, the active materials and the ordinary temperature molten salt is reduced.

It is preferable that the specific surface area of the positive electrode active material is from 0.1 $m^2/g$ to 10 $m^2/g$. Positive electrode active materials having a specific surface area of 0.1 $m^2/g$ or more can secure a sufficient site for absorbing and releasing lithium ions. Positive electrode active materials having a specific surface area of 10 $m^2/g$ or less is easily handled in industrial production, and can secure excellent charge-and-discharge cycle performance.

The binder is blended to bind the positive electrode active material and the current collector each other. Examples of the binder include polytetrafluoroethylene (PTFE), polyvinylidene fluoride (PVdF), and fluoro-rubber.

A conductive agent can be blended in the positive electrode layer if necessary in order to enhance the current collecting performance and to suppress the contact resistance with respect to the current collector. Examples of the conductive agent include carbonaceous materials such as acetylene black, carbon black and graphite.

It is preferable that the blending ratios of the positive electrode active material and the binder in the positive electrode layer are from 80% by mass to 98% by mass for the positive electrode active material, and from 2% by mass to 20% by mass for the binder, respectively. When the amount of the binder is not less than 2% by mass, sufficient electrode strength is obtained. Furthermore, when the amount of the binder is not more than 20% by mass, the blending amount of insulating materials in the electrode can be reduced, and thus internal resistance can be reduced.

When the conductive agent is added, it is preferable that the positive electrode active material, the binder and the conductive agent are blended at the ratio from 77% by mass to 95% by mass, from 2% by mass to 20% by mass, and from 3% by mass to 15% by mass. When the amount of the conductive agent is made to be not less than 3% by mass, the above-mentioned effects and be sufficiently exhibited. Furthermore, when the amount of the conductive agent is made to be not more than 15% by mass, decomposition of the nonaqueous electrolyte on the surface of the positive electrode conductive agent in high-temperature preservation can be reduced.

It is preferable that the positive electrode current collector is an aluminum foil, or an aluminum alloy foil including one or more elements selected from Mg, Ti, Zn, Ni, Cr, Mn, Fe, Cu, and Si.

It is desirable that the thickness of the aluminum foil or the aluminum alloy foil be from 5 µm to 20 µm, and more preferably 15 µm or less. The purity of the aluminum foil is preferably not less than 99% by mass. It is preferable that the content of transition metals such as iron, copper, nickel, and chromium included in the aluminum foil or the an aluminum alloy foil is made to be not more than 1% by mass.

The positive electrode is prepared by, for example, suspending the positive electrode active material, the binder and the conductive agent that is blended if necessary into an appropriate solvent to prepare slurry, applying the slurry onto the positive current collector, drying thereof to form a positive electrode layer, and then pressing thereof.

Alternatively, the positive electrode can be also produced by forming the positive electrode active material, the binder and the conductive agent that is blended if necessary into a pellet to obtain a positive electrode layer, and disposing the layer on the positive current collector.

(3) Nonaqueous Electrolyte

A nonaqueous electrolyte is, for example, liquid nonaqueous electrolyte prepared by dissolving electrolyte in an organic solvent, or gel-state nonaqueous electrolyte obtained by combining liquid electrolyte and a polymer material with each other.

It is preferable that the liquid nonaqueous electrolyte is prepared by dissolving electrolyte into an organic solvent at a concentration from 0.5 mol/L to 2.5 mol/L.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$) and bistrifluoromethylsulfonylimide lithium ($LiN(CF_3SO_2)_2$), and mixture thereof. It is preferable that the electrolyte is not easily oxidized even at a high potential. $LiPF_6$ is the most preferable.

Examples of the organic solvent include cyclic carbonates such as propylene carbonate (PC), ethylene carbonate (EC) and vinylene carbonate, chain carbonates such as diethyl carbonate (DEC), dimethyl carbonate (DMC) and methylethyl carbonate (MEC), cyclic ethers such as tetrahydrofuran (THF), 2-methyltetrahydrofuran (2MeTHF) and dioxolan (DOX), chain ethers such as dimethoxyethane (DME) and diethoxyethane (DEE), γ-butyrolactone (GBL), acetonitrile (AN), and sulfolane (SL). These organic solvents can be used alone or as a mixture solvent.

Examples of the polymer materials include polyvinylidene fluoride (PVdF), polyacrylonitrile (PAN) and polyethylene oxide (PEO).

Alternatively, as the nonaqueous electrolyte, an ordinary temperature molten salt containing lithium ions (ionic melt), polymeric solid electrolyte, inorganic solid electrolyte, and the like, may be used.

The ordinary temperature molten salt (ionic melt) refers to a compound that can exist as a liquid at an ordinary temperature (15° C. to 25° C.) among organic salts each including a combination of organic substance cations and anions. Examples of the ordinary temperature molten salt include an ordinary temperature molten salt existing as a liquid in a simple substance, ambient temperature molten salt that becomes a liquid by being mixed with an electrolyte, and ambient temperature molten salt that becomes a liquid by being dissolved in an organic solvent, and the like.

In general, a melting point of an ordinary temperature molten salt used for a nonaqueous electrolyte battery is 25° C. or lower. Furthermore, in general, an organic cation includes a quaternary ammonium skeleton.

The polymeric solid electrolyte is prepared by dissolving an electrolyte in a polymeric material, and solidifying the resulting material.

The inorganic solid electrolyte is a solid substance having lithium ion conductivity.

(4) Separator

A separator may be formed of, for example, a porous film including polyethylene, polypropylene, cellulose or polyvinylidene-fluoride (PVdF), or nonwoven fabric made of synthetic resin. Among them, a porous film formed of polyethylene or polypropylene can melt at a predetermined temperature to cut a current, and therefore can improve the safety.

(5) Exterior Member

Examples of an exterior member include a container made of a laminate film having a thickness of 0.5 mm or less, or a metal having a thickness of 1 mm or less. The thickness of the laminate film is more preferably 0.2 mm or less. The thickness of the metallic container is more preferably 0.5 mm or less, and further more preferably 0.2 mm or less.

Examples of the shape of the exterior member include a flat type (thin type), a rectangular type, a cylinder type, a coin type, a button type, and the like. Depending upon the dimension of battery, the exterior members may be, for example, an exterior member for a small battery incorporated in a portable electronic device or an exterior member for a large battery mounted on a two-wheeled or four-wheeled vehicle, or the like.

For the laminate film, a multilayer film in which a metallic layer is sandwiched between resin layers can be used. For reducing the weight, the metallic layer is preferably an aluminum foil or an aluminum alloy foil. Examples of materials for the resin layer include a polymeric material such as polypropylene (PP), polyethylene (PE), nylon, polyethylene terephthalate (PET), and the like. The laminate film can be shaped into a shape of an exterior member, by carrying out sealing by thermal fusion bonding.

The metallic container can be formed of, for example, aluminum, an aluminum alloy, or the like. As the aluminum alloy, an alloy including an element such as magnesium, zinc, and silicon is preferable. It is preferable that the content of a transition metal such as iron, copper, nickel, and chrome, if it is included, is not more than 1% by mass. Thus, it becomes possible to remarkably improve the long-term reliability in a high-temperature environment, and the heat-radiation property.

(6) Positive Electrode Terminal and Negative Electrode Terminal

A positive electrode terminal can be formed of a material having electrochemical stability at a Li absorption and release potential of the above-mentioned negative electrode active material, and having also conductivity. Specific examples of the material include copper, nickel, stainless steel, or aluminum. In order to reduce the contact resistance, the material is preferably the same as that of the negative electrode current collector.

The positive electrode terminal can be formed of a material having electric stability at a potential range from 3 V vs. Li/Li$^+$ to 5 V vs. Li/Li$^+$, and preferably from 3 V vs. Li/Li$^+$ to 4.25 V vs. Li/Li$^+$, and having also conductivity. Specifically, Examples of the material include aluminum and aluminum alloys including elements such as Mg, Ti, Zn, Mn, Fe, Cu and Si. In order to reduce contact resistance, the material is preferably the same as that of the positive electrode current collector.

Next, one example of a nonaqueous electrolyte battery according to a second embodiment will be explained in more detail with reference to FIGS. 10 and 11.

Figure 10:
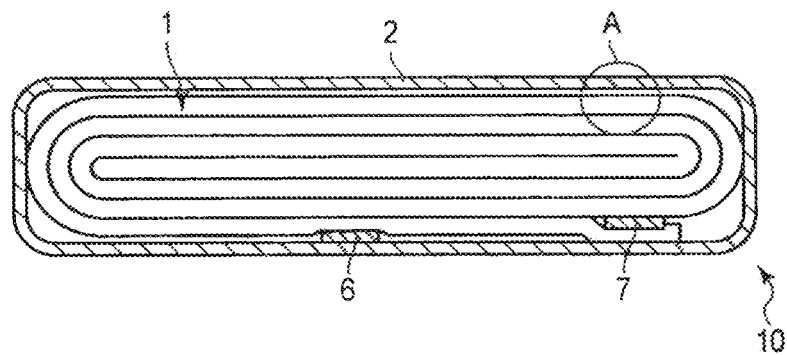
FIG. 10 is a schematic sectional view of a nonaqueous electrolyte battery of one example according to a second embodiment.

FIG. 10 is a schematic sectional view of a nonaqueous electrolyte battery of one example according to the second embodiment. FIG. 11 is an enlarged sectional view of a part A in FIG. 10.

A flat type nonaqueous electrolyte battery 10 shown in FIG. 10 includes a flat-shaped coiled electrode group 1 and a bag-shaped exterior member 2 housing the flat-shaped coiled electrode group 1. The bag-shaped exterior member 2 is made of a laminate film including two resin films and a metal layer sandwiched between the resin films.

The flat-shaped coiled electrode group 1 is formed by stacking a negative electrode 3, a separator 4, a positive electrode 5, and a separator 4 sequentially in this order from the outer side so as to obtain a stack, coiling the stack in a spiral shape, and press-molding the coiled product. The negative electrode 3 in the outermost layer has a configuration in which a negative electrode layer 3b is formed on one side of the internal surface of a negative electrode current collector 3a as shown in FIG. 11. The other portion of the negative electrode 3 has a configuration in which the negative electrode layer 3b is formed on both surfaces of the negative electrode current collector 3a. The positive electrode 5 has a configuration in which a positive electrode layer 5b is formed on both surfaces of a positive electrode current collector 5a.

In the vicinity of the outer peripheral end of the coiled electrode group 1, a negative electrode terminal 6 is connected to the negative electrode current collector 3a of the negative electrode 3 in the outermost layer, and a positive electrode terminal 7 is connected to the positive electrode current collector 5a of the inner side positive electrode 5. The negative electrode terminal 6 and the positive electrode terminal 7 are extended to the outside from an opening part of the bag-shaped exterior member 2. For example, liquid nonaqueous electrolyte is filled from the opening part of the bag-shaped exterior member 2. The opening part of the bag-shaped exterior member 2 is subjected to heat sealing with the negative electrode terminal 6 and the positive electrode terminal 7 interposed therein, and thereby completely sealing the coiled electrode group 1 and the liquid nonaqueous electrolyte.

Figure 11:
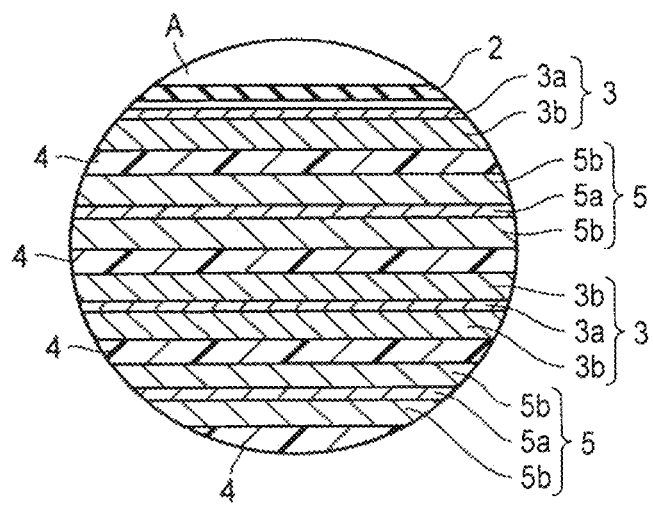
FIG. 11 is an enlarged sectional view of a part A in FIG. 10.
Figure 12:
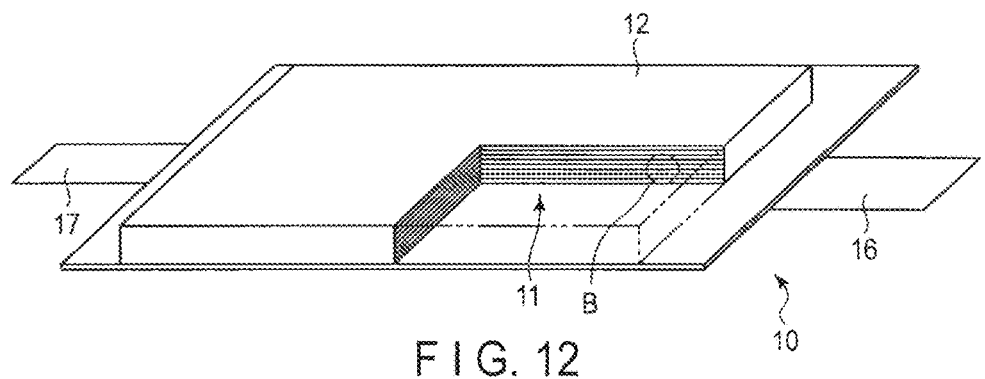
FIG. 12 is a schematic sectional view of a nonaqueous electrolyte battery of another example according to the second embodiment.
Figure 13:
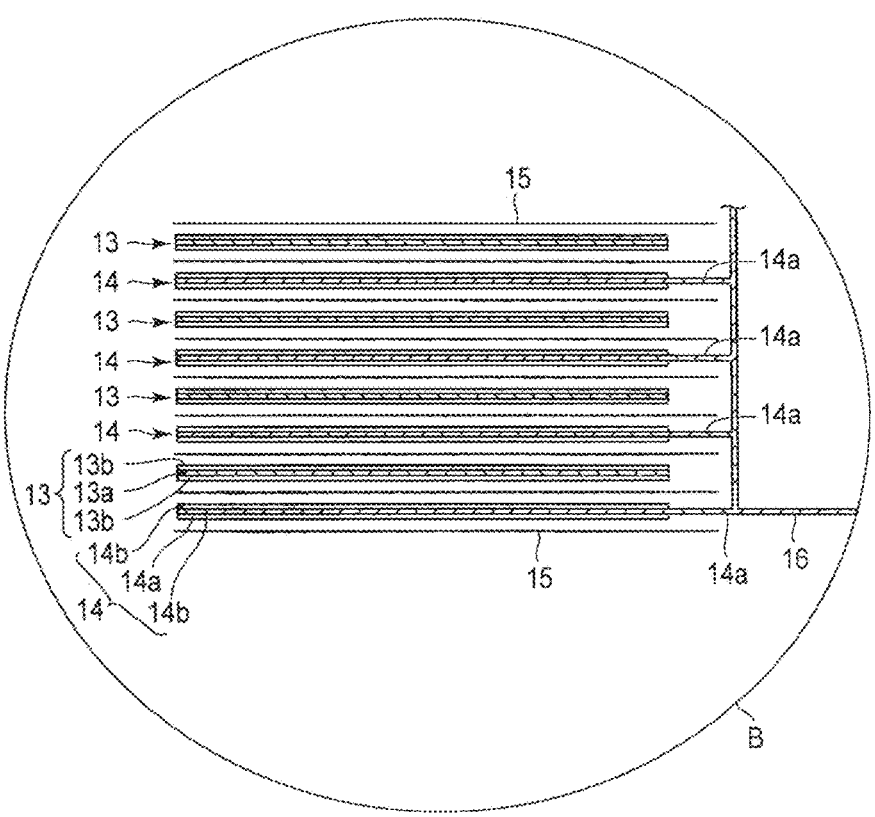
FIG. 13 is an enlarged sectional view of a part B in FIG. 12.

The nonaqueous electrolyte battery according to the second embodiment is not necessarily limited to the above-mentioned configuration shown in FIGS. 10 and 11, but it may have a configuration shown in, for example, FIGS. 12 and 13.

FIG. 12 is a schematic sectional view of a nonaqueous electrolyte battery of another example according to the second embodiment. FIG. 13 is an enlarged sectional view of a part B in FIG. 12.

A flat type nonaqueous electrolyte battery 10 shown in FIGS. 12 and 13 includes a stacked electrode group 11, and an exterior member 12 housing the laminated electrode group 11. The exterior member 12 is made of a laminate film including two resin films and a metal layer sandwiched between the resin films.

As shown in FIG. 13, the laminated electrode group 11 has a structure in which a positive electrode 13 and a negative electrode 14 are alternately laminated with a separator 15 sandwiched therebetween. A plurality of the positive electrodes 13 exists, and each of them includes a current collector 13a and a positive electrode active material containing layer 13b supported by both surfaces of the current collector 13a. A plurality of the negative electrodes 14 exists, and each of them includes a current collector 14a and negative electrode active material containing layer 14b supported by both surfaces of the current collector 14a. One side of the current collector 14a of each of the negative electrodes 14 protrudes from the positive electrode 13. The protruding current collectors 14a are electrically connected to a belt-like negative electrode terminal 16. The tip end of the belt-like negative electrode terminal 16 is drawn out to the outside from the exterior member 12. Although not shown, in the current collector 13a of each of the positive electrode 13, a side, which is positioned opposite to the protruding side of the current collectors 14a, protrudes. The current collectors 13a protruding from the negative electrodes 14 are electrically connected to a belt-like positive electrode terminal 17. The tip end of the belt-like positive electrode terminal 17 is located at the opposite side to the negative electrode terminal 16, and drawn out to the outside from the side of the exterior member 12.

The nonaqueous electrolyte battery according to the second embodiment includes the active material according to the first embodiment. Therefore, The nonaqueous electrolyte battery can exhibit excellent input-and-output characteristics and excellent cycle characteristics.

Third Embodiment

According to a third embodiment, there is provided a battery pack. The battery pack includes the nonaqueous electrolyte battery according to the second embodiment.

The battery pack according to the third embodiment can also include a plurality of the nonaqueous electrolyte batteries. The nonaqueous electrolyte batteries can be electrically connected to each other in series or in parallel. Alternatively, the nonaqueous electrolyte batteries can be electrically connected to each other in the combination of the series connection and the parallel connection.

Next, an example of the battery pack according to the third embodiment will be described with reference to FIGS. 14 and 15.

Figure 14:
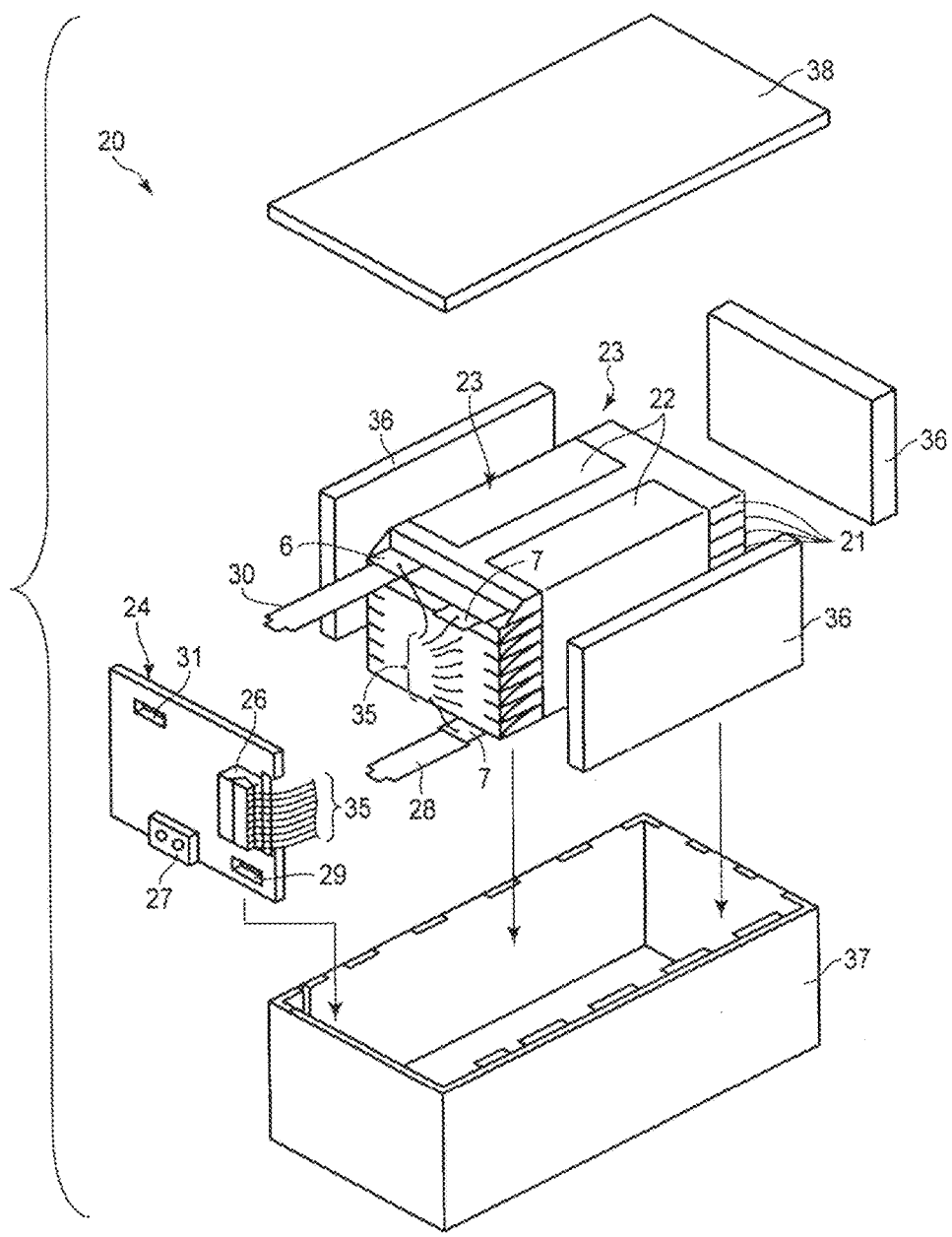
FIG. 14 is an exploded perspective view of a battery pack of one example according to a third embodiment.

FIG. 14 is a schematic exploded perspective view of the battery pack of an example according to the third embodiment. FIG. 15 is a block diagram showing an electric circuit of the battery pack shown in FIG. 14.

The battery pack 20 shown in FIGS. 14 and 15 includes a plurality of unit cells 21. The unit cell 21 is an example of the flat-shaped nonaqueous electrolyte battery according to the second embodiment which has been described with reference to FIGS. 10 and 11.

The plural unit cells 21 are stacked so that the negative electrode terminal 6 extended outside and the positive electrode terminal 7 are arranged in the same direction and fastened with an adhesive tape 22, and constitute a battery module 23. The unit cells 21 are electrically connected in series with one another as shown in FIG. 15.

A printed wiring board 24 is arranged opposed to the side plane where the negative electrode terminal 6 and the positive electrode terminal 7 of the unit cell 21 are extended. A thermistor 25, a protective circuit 26, and an energizing terminal 27 to an external device are mounted on the printed wiring board 24 as shown in FIG. 15. An electric insulating plate (not shown) is attached to the surface of the printed wiring board 24 facing the battery module 23 to avoid unnecessary connection of the wiring of the battery module 23.

A positive electrode-side lead 28 is connected to the positive electrode terminal 7 located at the bottom layer of the battery module 23 and the distal end of the lead 28 is inserted into a positive electrode-side connector 29 of the printed wiring board 24 so as to be electrically connected. An negative electrode-side lead 30 is connected to the negative electrode terminal 6 located at the top layer of the battery module 23 and the distal end of the lead 30 is inserted into an negative electrode-side connector 31 of the printed wiring board 24 so as to be electrically connected. The connectors 29 and 31 are connected to the protective circuit 26 through wirings 32 and 33 formed in the printed wiring board 24.

The thermistor 25 detects the temperature of the unit cells 21 and the detection signal is sent to the protective circuit 26. The protective circuit 26 can shut down a plus-side wiring 34a and a minus-side wiring 34b between the protective circuit 26 and the energizing terminal 27 to an external device under a predetermined condition. The predetermined condition indicates, for example, the case where the temperature detected by the thermistor 25 becomes a predetermined temperature or more. Another example of the predetermined condition indicates the case of the over-charge, over-discharge, or over-current of the unit cells 21. The detection of the over-charge and the like is performed on each of the unit cells 21 or the whole of the battery module 23. When each of the unit cells 21 is detected, the cell voltage may be detected, or positive electrode or negative electrode potential may be detected. In the case of the latter, a lithium electrode to be used as a reference electrode is inserted into each of the unit cells 21. In the case of the battery pack 20 of FIGS. 14 and 15, wirings 35 for voltage detection are connected to each of the unit cells 21. Detection signals are sent to the protective circuit 26 through the wirings 35.

Protective sheets 36 included of rubber or resin are arranged on each of three side planes of the battery module 23 except the side plane in which the positive electrode terminal 7 and the negative electrode terminal 6 are protruded.

The battery module 23 is housed in a housing container 37 together with each of the protective sheets 36 and the printed wiring board 24. That is, the protective sheets 36 are arranged on both internal surfaces in a long side direction and on one internal surface in a short side direction of the housing container 37. The printed wiring board 24 is arranged on the other internal surface in a short side direction. The battery module 23 is located in a space surrounded by the protective sheets 36 and the printed wiring board 24. A lid 38 is attached to the upper surface of the housing case 37.

In order to fix the battery module 23, a heat-shrinkable tape may be used in place of the adhesive tape 22. In this case, the battery module is bound by placing the protective sheets on the both sides of the battery module, revolving the heat-shrinkable tube, and thermally shrinking the heat-shrinkable tube.

In FIGS. 14 and 15, the structure in which the unit cells 21 are connected in series is shown. In order to increase the battery capacity, the unit cells may be connected in parallel. Furthermore, the assembled battery pack can be connected in series and/or in parallel.

The aspect of the battery pack according to the third embodiment may be appropriately changed depending on its application. The applications of the battery pack according to the third embodiment are preferably those for which cycle characteristics in large-current characteristics are desired.

Specific examples of these applications include application as a power source of a digital camera and application to a vehicle such as a two- or four-wheeled hybrid electric vehicle, a two- or four-wheeled electric vehicle or a power-assisted bicycle. Particularly preferably, the battery pack according to the third embodiment is used for a power source mounted to a vehicle.

The battery pack according to the third embodiment includes the nonaqueous electrolyte battery according to the second embodiment. Therefore, the battery pack can exhibit excellent input-and-output characteristics and excellent cycle characteristics.

EXAMPLES

Examples will be explained below. However, the present invention is not limited to the examples described below as long as it is within the concepts of the present invention.

Example

Preparation of Monoclinic Niobium-Titanium Composite Oxide

In Example, an active material was prepared by the following procedures.

As the starting raw material, 1 mol/L of a solution of titanyl sulfate in diluted sulfuric acid and 2 mol/L of a solution of niobium chloride in ethanol were used. The both solutions were mixed with each other to obtain a transparent mixed solution free from precipitation of foreign matters such as hydroxide.

Next, aqueous ammonia was dripped to the obtained mixed solution while stirring to thus obtain white precipitates. The obtained precipitates were washed with pure water, filtered, and then dried by a heater at 80° C. After drying, the obtained substances were pulverized in a mortar, thereby disaggregating coagulation. Thus, precursor powder was obtained.

The thus obtained precursor powder was sintered in the air for one hour by raising temperature to 1100° C. at a temperature increasing rate of 30° C./min. Thereafter, the obtained product was pulverized in a mortar again. Thus, active material powder was obtained.

It was found from the ICP analysis that the obtained active material powder had a ratio, Nb/Ti, of 2. Furthermore, the obtained active material powder was subjected to XRD measurement, and peaks belonging to the monoclinic $Nb_2TiO_7$ phase were detected.

Comparative Example 1

A part of the monoclinic niobium-titanium composite oxide powder obtained as mentioned above was defined as an active material of Comparative Example 1. The active material of Comparative Example 1, acetylene black as a conductive aid, and polyvinylidene fluoride (PVdF) as a binder were put into N-methyl-pyrrolidone (NMP) to obtain a slurry. At this time, the mass ratio of the active material of Comparative Example 1:acetylene black:PVdF was 100:5:5. Addition of not less than 10 parts by weight of the conductive aid and not less than 10 parts by weight of the binder can suppress the loss of the electroconductive path due to a change of the volume of the active material at the time of charge and discharge. However, in order to verify the effect of a surface reduction layer described below, the amounts of the electric conducting agent and the binder are set to be small here.

The thus obtained slurry was applied to one side of a current collector that is an aluminum foil having a thickness of 12 μm, the applied film was dried, and then subjected to pressing. Thus, an electrode including an electrode layer having an electrode mass per unit area of 25 $g/m^2$ was produced.

<Preparation of Test Cell>

By using the thus produced electrode as a work electrode, and Li metal as a counter electrode and a reference electrode, a three-electrode beaker cell was produced in an argon atmosphere.

On the other hand, a nonaqueous electrolyte was prepared by mixing ethylene carbonate (EC) and diethyl carbonate (DEC) at the volume ratio of 1:2 to obtain a mixed solvent and dissolving LiTFSI supporting salt in the mixed solvent in 1 mol/L. The nonaqueous electrolyte was placed into the previously produced three-electrode beaker cell in an argon atmosphere to produce a test cell of Comparative Example 1.

Examples 1 and 2

In Examples 1 and 2, active materials of Examples 1 and 2 were prepared by the following procedures.

Firstly, another part of the previously prepared monoclinic niobium-titanium composite oxide powder was further divided into two parts.

Each of the two-divided parts of the powder was subjected to heat treatment in an atmosphere of Ar—$H_2$ (3%) at 900° C. in an electric furnace to obtain the active material of Examples 1 and 2, respectively. The active material of Example 1 was obtained by heat treatment for 30 minutes. The active material of Example 2 was obtained by heat treatment for 60 minutes.

Test cells of Examples 1 and 2 were produced by using a part of each of the active materials of Examples 1 and 2 by the same procedure as in Comparative Example 1.

<Measurement of Conductivity>

The active materials of Examples 1 and 2, and Comparative Example 1 were examined for the relation between the pressure applied to the active materials and the conductivity. Specifically, the examination was carried out as follows. The obtained active materials were weighed (herein, 1.5 g), and introduced into a powder resistance measurement system. The powder layer was compressed. In the case of low resistance, the resistivity when different pressures were applied was measured by a constant current method by a four-point probe method. In the case of high resistance, measurement was carried out by a constant voltage method by a two concentric ring electrodes method. The results are shown in FIG. 16.

Figure 16:
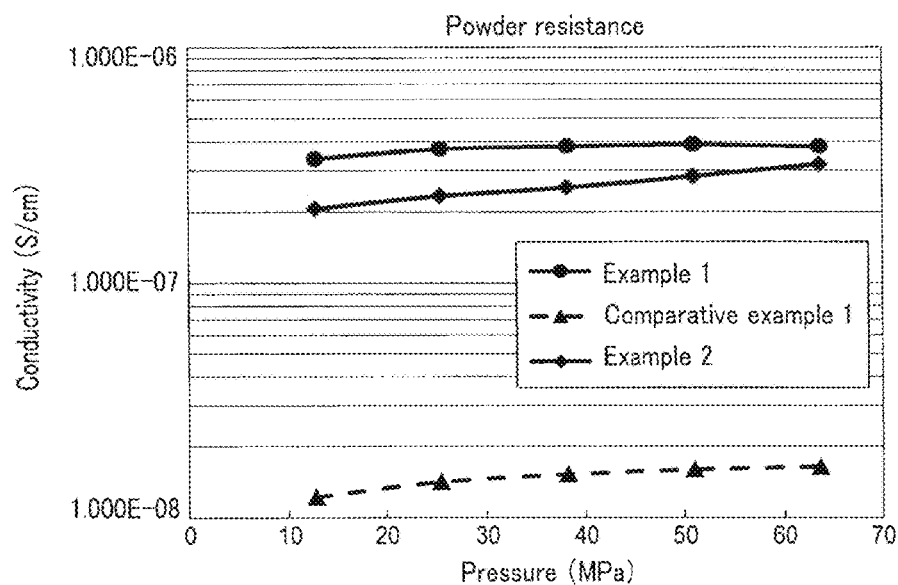
FIG. 16 is a graph showing a relation between a pressure applied to an active material and the conductivity of the active material, with respect to each of the active materials of Examples 1 and 2 and Comparative Example 1.

From FIG. 16, it was shown that the active materials of Examples 1 and 2 had much higher conductivity than that of the active material of Comparative Example 1.

<Initial Charge and Discharge Test>

The initial charge and discharge test was carried out by using the test cells of Examples 1 and 2, Comparative Example 1 by the following procedures. Firstly, charging was carried out at a constant current of 0.2 C rate until the voltage reached 1.0 V. Then, after a rest of 10 hours at a low voltage of 1.0 V, charging was released for 10 minutes. Thereafter, discharging was carried out at 0.2 C rate until the voltage reached 3.0 V. Under the charge and discharge conditions, the initial charge and discharge were carried out for the test cells of Examples 1 and 2 and the test cell of Comparative Example 1.

Figure 17:
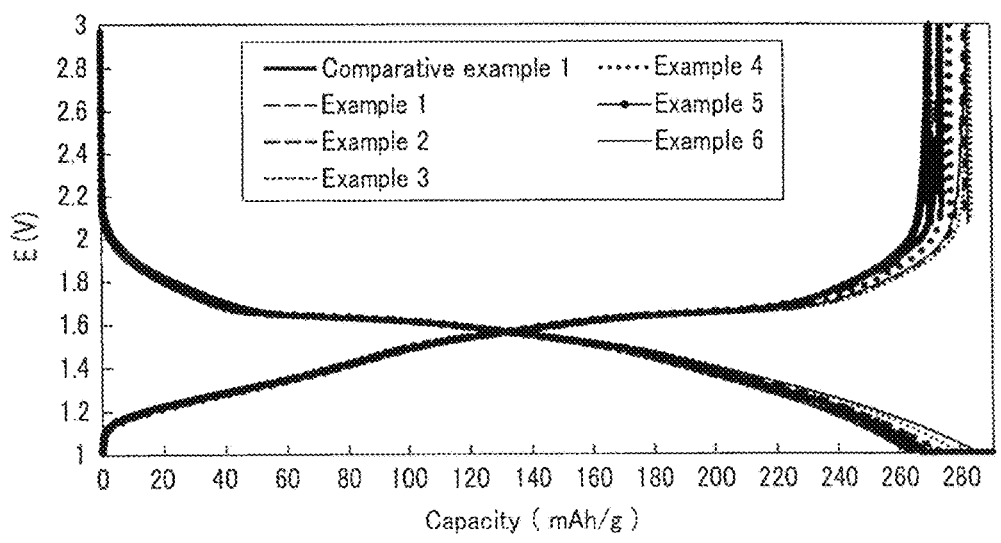
FIG. 17 is an initial charge and discharge curve of each of the active materials of Examples 1 to 6 and Comparative Example 1.

The initial charge and discharge curves of the test cells of Examples 1 and 2 and Comparative Example 1 are shown in FIG. 17. As shown in FIG. 17, the test cells of Examples 1 and 2 and Comparative Example 1 showed the similar the initial charge and discharge curves.

Examples 3 to 6

In Examples 3 to 6, active materials of Examples 3 to 6 were prepared by the following procedures.

Firstly, still another part of the previously prepared monoclinic niobium-titanium composite oxide powder was further divided into four parts.

Each of the four-divided parts of the powder was subjected to the same heat treatment as in Examples 1 and 2 except that temperatures and times are changed. In Example 3, the heat treatment was carried out at 950° C. for 30 minutes. In Example 4, the heat treatment was carried out at 950° C. for 60 minutes. In Example 5, the heat treatment was carried out at 1000° C. for 30 minutes. In Example 6, the heat treatment was carried out at 1000° C. for 60 minutes. Thus, the active materials of Examples 3 to 6 were obtained, respectively.

Test cells of Examples 3 to 6 were produced by using a part of each of the active materials of Examples 3 to 6 by the same procedure as in Comparative Example 1.

Figure 18:
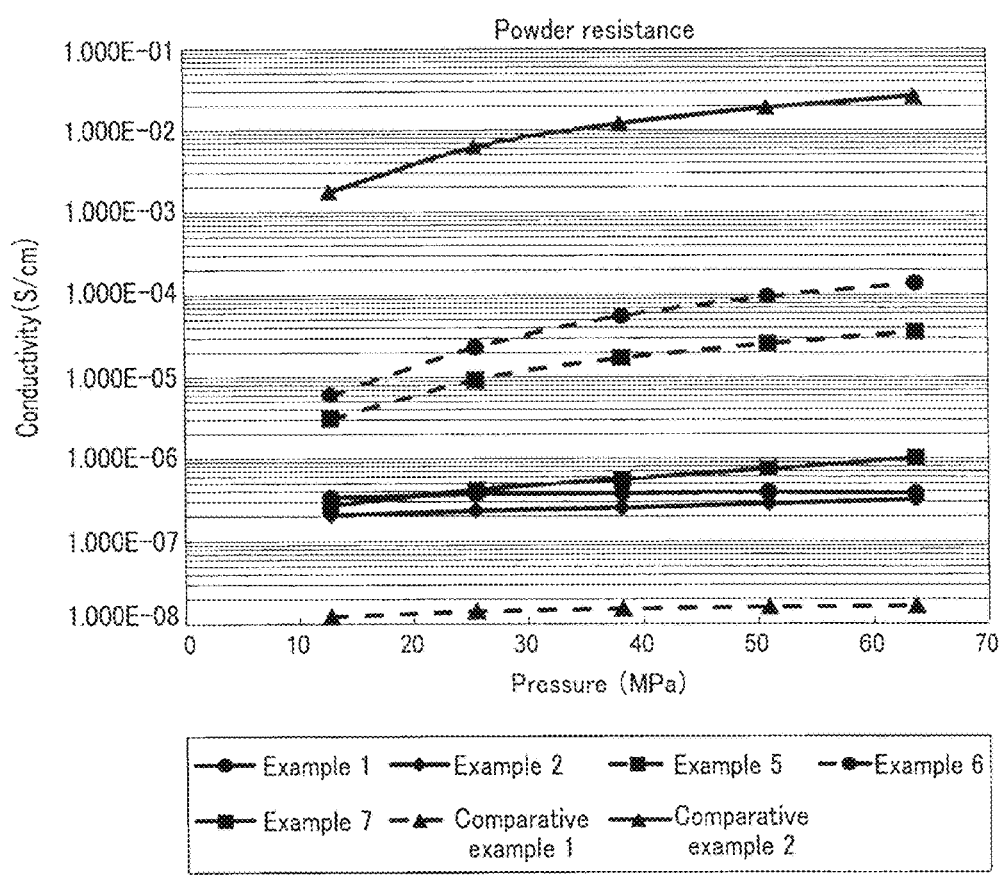
FIG. 18 is a graph showing a relation between the pressure applied to an active material and the conductivity of the active material, with respect to each of the active materials of Examples 1, 2, and 5 to 7 and Comparative Examples 1 and 2.

The active materials of Examples 3 to 6 were examined for the relation between the pressure applied to the active materials and the conductivity by the same procedures as in Examples 1 and 2. As a result, similar to the active materials of Examples 1 and 2, the active materials of Examples 3 to 6 showed more excellent conductivity than that of Comparative Example 1. The results of Examples 5 and 6 are shown in FIG. 18 together with the results of Examples 1 and 2 and Comparative Example 1.

<Initial Charge and Discharge Test>

The initial charge and discharge test was carried out by using the test cells of Examples 3 to 6. The charge and discharge test was carried out under the same conditions as in Example 1.

The initial charge and discharge curves of the test cells of Examples 3 to 6 together with the charge and discharge curves of the test cells of Examples 1 and 2 are shown in FIG. 17. As shown in FIG. 17, the test cells of Examples 1 to 6 showed the similar the charge and discharge curves.

Example 7

In Example 7, an active material of Example 7 was prepared by the following procedures.

Firstly, the other part of the previously prepared monoclinic niobium-titanium composite oxide powder was mixed with 5 wt % sucrose aqueous solution, and the resultant mixture was heated at about 70° C. until water evaporated. The thus obtained powder was subjected to heat treatment in an atmosphere of Ar—$H_2$ (3%) at 900° C. for 30 minutes to prepare a composite.

The obtained composite was subjected to heat treatment by the same procedure as in Example 1 to obtain an active material of Example 7.

Test cells of Example 7 was produced by using a part of the active materials of Example 7 by the same procedure as in Comparative Example 1.

Comparative Example 2

In Comparative Example 2, the active material of Comparative Example 2 was prepared by the same procedure as in Example 1 except that heat treatment was carried out for 24 hours.

The test cell of Comparative Example 2 was produced by the same procedure as in Comparative Example 1 by using a part of the active material of Comparative Example 2.

The active material of Example 7 was examined for the relation between the density and the conductivity by the same procedures as in Examples 1 and 2. As a result, similar to the active materials of Examples 1 and 2, the active material of Example 7 showed more excellent conductivity than that of Comparative Example 1.

Similarly, active material of Comparative Example 2 was examined for the relation between the density and the conductivity by the same procedures as in Examples 1 and 2. As a result, the active material of Comparative Example 2 showed higher conductivity by 6 digit as compared with that of Comparative Example 1. The result of Comparative Example 2 is shown in FIG. 18.

<Initial Charge and Discharge Test>

The initial charge and discharge test was carried out by using the test cells of Example 7 and Comparative Example 2. The charge and discharge test was carried out under the same condition as in Example 1.

Figure 19:
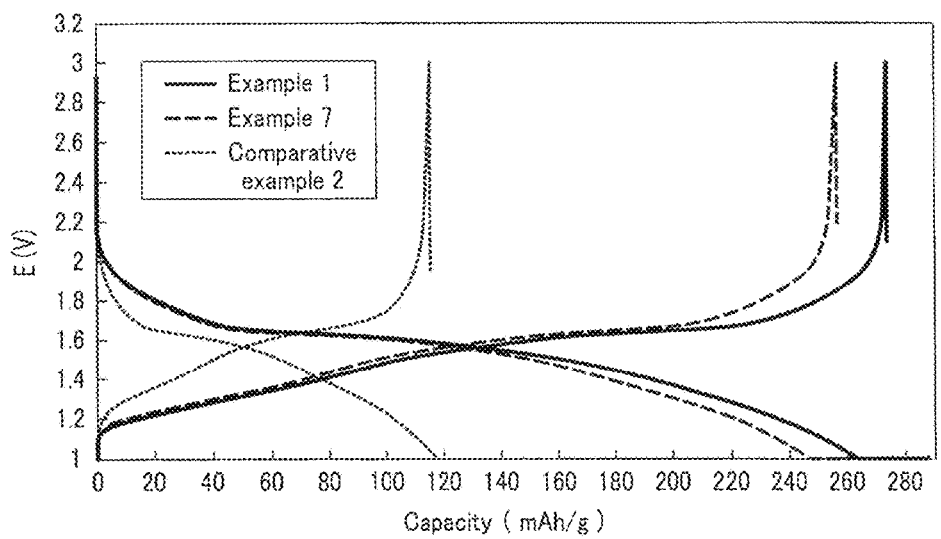
FIG. 19 is an initial charge and discharge curve of each of the active materials of Examples 1 and 7 and Comparative Example 2.

The initial charge and discharge curves of the test cells of Example 7 and Comparative Example 2 together with the charge and discharge curve of the test cells of Example 1 are shown in FIG. 19.

As shown in FIG. 19, the test cell of Example 7 showed the initial charge and discharge curve similar to that of the test cell of Example 1.

On the other hand, as shown in FIG. 19, the test cell of Comparative Example 2 showed remarkably low capacity as compared with the test cells of Examples 1 and 7.

[Results of Initial Charge and Discharge Test]

Results of the initial charge and discharge test for the test cells of Examples 1 to 7 and Comparative Examples 1 and 2 are shown in the following Table 1 again.

TABLE 1

|  | Initial Charge Capacity (mAh/g) | Initial Discharge Capacity (mAh/g) | Initial Discharge/Charge Efficiency (%) |
| --- | --- | --- | --- |
| Example 1 | 287.7 | 273.1 | 94.9 |
| Example 2 | 282.8 | 265.4 | 93.8 |
| Example 3 | 295.8 | 275.1 | 93.0 |
| Example 4 | 288.9 | 268.7 | 93 |
| Example 5 | 281.3 | 260 | 92.4 |
| Example 6 | 305.5 | 274.2 | 89.8 |
| Example 7 | 275.1 | 255.6 | 92.9 |
| Comparative Example 1 | 288.2 | 265.9 | 92.3 |
| Comparative Example 2 | 142.0 | 115.5 | 81.3 |

As is apparent from the above-mentioned description and Table 1, the active materials of Examples 1 to 7 showed more excellent conductivity as compared with the active material of Comparative Example 1, while they achieved the similar capacity to that of Comparative Example 1. On the other hand, Comparative Example 2 showed much lower capacity as compared with those of Examples 1 to 7 and Comparative Example 1. This is thought to be because in Comparative Example 2, the heat treatment in the reducing atmosphere was carried out for a long time, so that the monoclinic niobium-titanium composite oxide was completely reduced.

<Cycle Test>

Figure 20:
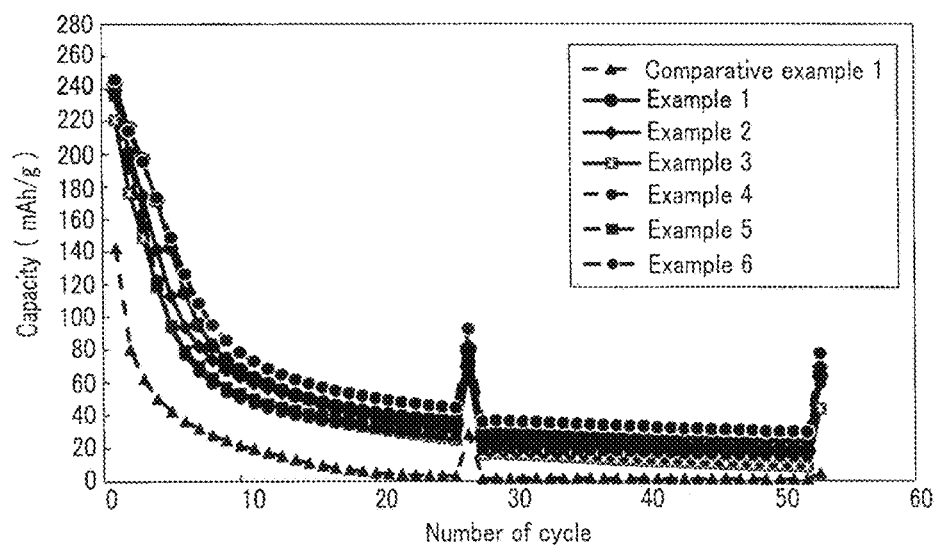
FIG. 20 is a graph showing cycle characteristics of test cells of Examples 1 and 6 and Comparative Example 1.

A cycle test was carried out with respect to the test cells of Examples 1 to 6 and the test cell of Comparative Example 1. The results thereof are shown in FIG. 20. The cycle test was carried out by, after the initial charge and discharge and rate test at 25° C., repeating charge and discharge in the environment at 45° C. and at 1 C rate.

As is apparent from the results shown in FIG. 20, the test cells of Examples 1 to 6 showed more excellent cycle characteristics than those of the test cell of Comparative Example 1. Note here that the reason why the cycle characteristics shown in FIG. 20 were entirely low is because the amounts of the electric conducting agent and the binder are small.

<Rate Test>

The test cells of Examples 1 to 6 and the test cell of Comparative Example 1 were subjected to a rate test.

In the rate test, each test cell was discharged from the initial potential of 1.0 V (vs. Li/Li$^+$) to the final potential of 3.0 V (vs. Li/Li$^+$). The temperature environment was set to 25° C. Discharging in the rate test was carried out while changing the rate from 0.2 C, 1 C, 2 C, 5 C, 10 C, 20 C, and 0.2 C, sequentially in this order. The discharging of each test cell was carried out seven times each.

Figure 21:
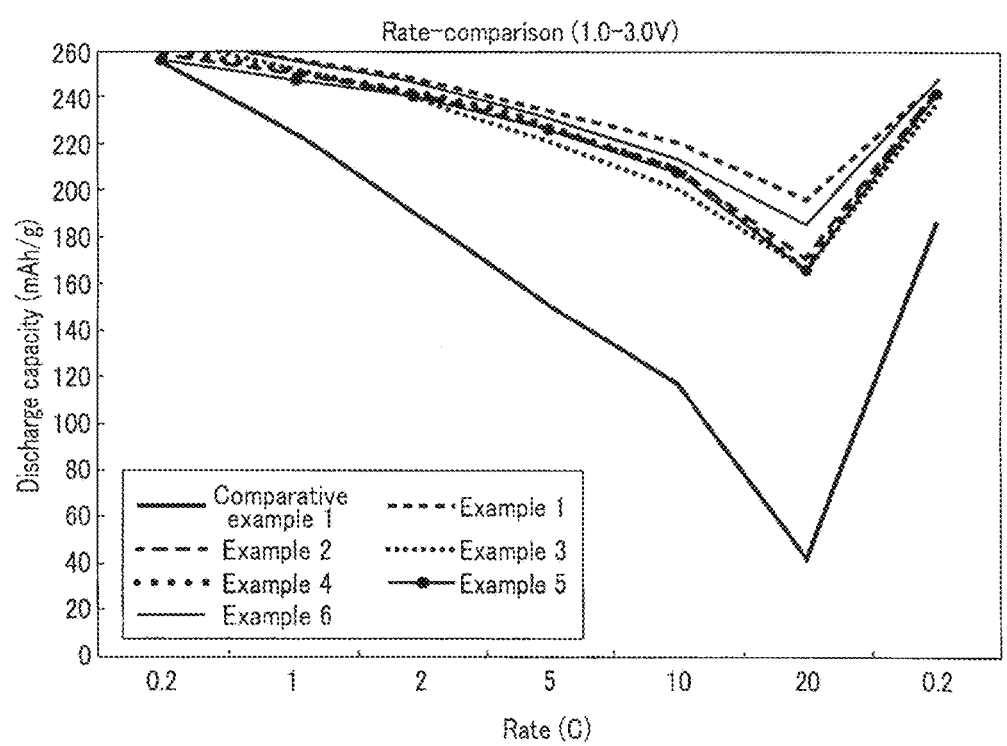
FIG. 21 is a graph showing rate characteristics of the test cells of Examples 1 to 6 and Comparative Example 1.
Figure 22:
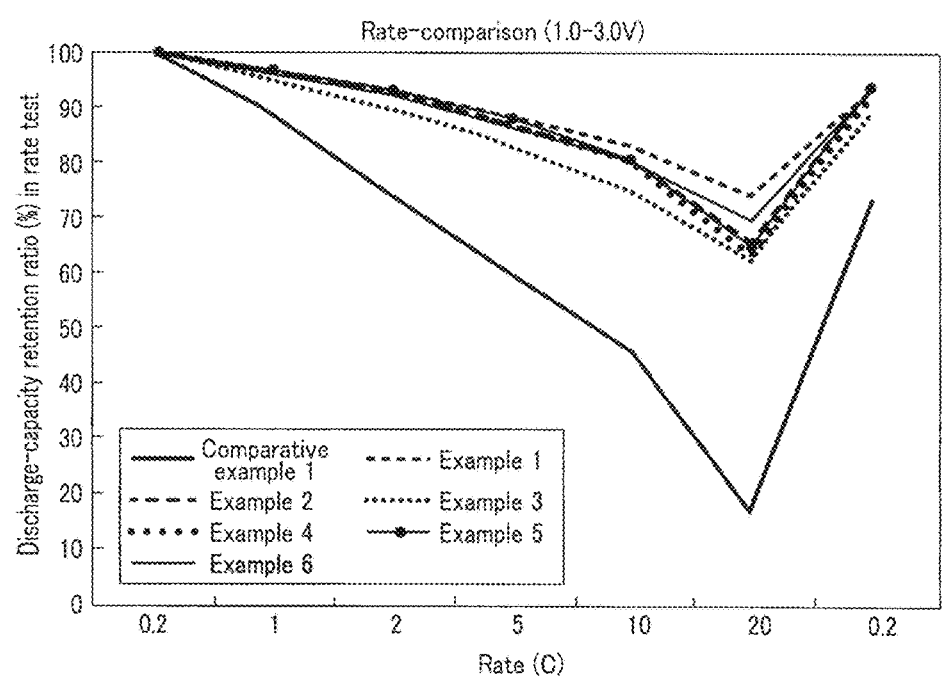
FIG. 22 is a graph showing discharge-capacity retention ratios in rate test of the test cells of Examples 1 to 6 and Comparative Example 1.

FIG. 21 shows discharge capacity per weight of each active material, obtained in each rate test. Furthermore, FIG. 22 shows a discharge-capacity retention ratio in rate test of each test cell. FIG. 22 shows discharge capacities at 1 C, 2 C, 5 C, 10 C, and 20 C, and discharge capacity at 0.2 C at the second time as the discharge-capacity retention ratio in rate test, which is represented by relative values when the discharge capacity at 0.2 C at the initial time is defined as 100.

As is apparent from FIGS. 21 and 22, the test cells of Examples 1 to 6 showed more excellent rate characteristics than those of Comparative Example 1. Furthermore, as is apparent from FIG. 22, in the test cell of each of Examples 1 to 6, the discharge capacity at 0.2 C at the second time was 80% or more with respect to the discharge capacity at the first time. On the contrary, in test cell of Comparative Example 1, the discharge capacity at 0.2 C at the second time is less than 80% with respect to the discharge capacity at 0.2 C at the first time. The result shows that the deterioration by discharge at a large electric current was suppressed more in the test cells of Examples 1 to 6 than in the test cell of Comparative Example 1.

<Comparison of Conductivity of Active Material of Each of Example 6, Example 7, and Comparative Example 1>

The active material of Example 7 mentioned above was subjected to powder resistance measurement in order to verify the conductivity. The results thereof are shown in FIG. 23.

As is apparent from FIG. 23, the conductivity of the active material of Example 7 is higher than the conductivity of the active material of Example 6, and higher than the conductivity of the active material of Comparative Example 1.

<Rate Characteristics of Evaluation Cell of Example 7>

The test cell of Example 7 was subjected to the same rate test as that for the test cells in Examples 1 to 6 and Comparative Example 1. As a result, it is shown that the same result as those in Examples 1 to 6 was obtained also in the test cell of Example 7.

The active materials according to at least one of the above-described Embodiments and Examples include particles each of which includes a core phase and a shell phase. The shell phase surrounds at least a part of the core phase. The core phase includes the first monoclinic niobium-titanium composite oxide. The shell phase includes the second monoclinic niobium-titanium composite oxide. The oxidation number of titanium included in the core phase is larger than the oxidation number of titanium included in the shell phase, or the oxidation number of niobium included in the core phase is larger than the oxidation number of niobium included in the shell phase. Thus, this active material can achieve a nonaqueous electrolyte battery having excellent input and output characteristics and cycle characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material comprising:
   particles each comprising
      a core phase comprising a first monoclinic niobium-titanium composite oxide represented by a formula of $Nb_2TiO_7$ or $Nb_2TiO_{7-\delta}$, $0<\delta\leq0.3$, the core being in a form of an aggregate of particles; and
      a shell phase comprising a second monoclinic niobium-titanium composite oxide and surrounding at least a part of the core phase, the second monoclinic niobium-titanium composite oxide being represented by a formula of $Nb_{1.33}Ti_{0.67}O_4$,
      wherein the shell phase is a layer partially surrounding the core phase.

2. The active material according to claim 1, wherein the particles each comprising the core phase and the shell phase have a molar ratio of niobium to titanium Nb/Ti within a range of $0<Nb/Ti\leq2$.

3. The active material according to claim 1, further comprising a carbon layer covering the particles each comprising the core phase and the shell phase.

4. A nonaqueous electrolyte battery comprising:
   a negative electrode comprising the active material according to claim 1;
   a positive electrode; and
   a nonaqueous electrolyte.

5. A battery pack comprising:
   the nonaqueous electrolyte battery according to claim 4.

6. The battery pack according to claim 5, further comprising a protective circuit which detects a voltage of the nonaqueous electrolyte battery.

7. A battery pack comprising a plurality of nonaqueous electrolyte batteries, each of the plurality of nonaqueous electrolyte batteries comprising:
   a positive electrode;
   a negative electrode comprising the active material according to claim 1; and
   a nonaqueous electrolyte,
   wherein the plurality of nonaqueous electrolyte batteries are electrically connected to each other in series and/or parallel.

8. The active material according to claim 1, wherein a material of the shell phase is a reduced product of a material of the core phase.

9. The active material according to claim 1, wherein the shell phase has a thickness within a range from 1 nm to 50 nm.

10. The active material according to claim 1, wherein the shell phase has a thickness corresponding to 0.6% or more and 30% or less with respect to a particle diameter of the particles each comprising the core phase and the shell phase.

* * * * *